United States Patent
Oswald et al.

(10) Patent No.: US 9,487,299 B2
(45) Date of Patent: Nov. 8, 2016

(54) RECONFIGURABLE CHILLED AIR OUTLET FOR AN AIRCRAFT GALLERY CHILLER

(75) Inventors: Ian Oswald, Santa Ana, CA (US); Qiao Lu, Placentia, CA (US); Steven Whisler, San Juan Capistrano, CA (US)

(73) Assignee: B/E AEROSPACE, INC., Wellington, FL (US)

( * ) Notice: Subject to any disclaimer, the term of this patent is extended or adjusted under 35 U.S.C. 154(b) by 990 days.

(21) Appl. No.: 13/599,840

(22) Filed: Aug. 30, 2012

(65) Prior Publication Data

US 2013/0047657 A1 Feb. 28, 2013

Related U.S. Application Data

(60) Provisional application No. 61/529,047, filed on Aug. 30, 2011.

(51) Int. Cl.
| | | |
|---|---|---|
| F25B 17/04 | (2006.01) | |
| B64D 13/06 | (2006.01) | |
| B64D 11/04 | (2006.01) | |

(Continued)

(52) U.S. Cl.
CPC ............. B64D 13/06 (2013.01); B64D 11/04 (2013.01); F25D 15/00 (2013.01); F25D 17/06 (2013.01); B64D 2013/0629 (2013.01); F25D 2317/0672 (2013.01); Y02T 50/44 (2013.01); Y02T 50/46 (2013.01); Y10T 29/49718 (2015.01)

(58) Field of Classification Search
CPC ........... F25D 17/06–17/08; F25D 2317/0672; F25D 15/00; B64D 13/06; B64D 11/04; F24F 7/013; F24F 7/06; F24F 7/065; F24F 13/0236; F15D 1/00; F15D 1/14
USPC .................. 62/407; 137/43; 454/63, 76, 142
See application file for complete search history.

(56) References Cited

U.S. PATENT DOCUMENTS 4,361,014 A * 11/1982 Blain ............................. 62/237
6,637,320 B2 10/2003 Grandi (Continued)

FOREIGN PATENT DOCUMENTS

| CN | 2200782 Y | 6/1995 |
|---|---|---|
| EP | 0898134 A2 | 2/1999 |

OTHER PUBLICATIONS

International Search Report and Written Opinion issued in related application PCT/US2012/053198 dated Nov. 23, 2012, 7 pages.

(Continued)

*Primary Examiner* — Orlando Aviles Bosques
(74) *Attorney, Agent, or Firm* — Drinker Biddle & Reath LLP

(57) ABSTRACT

A reconfigurable vent system in fluid communication with an air chiller to deliver chill air to one or more galley food and beverage storage compartments in parallel is reconfigurable to operate in either of an air-through or an air-over orientation. The reconfigurable vent system comprises a vent in fluid communication with the air chiller via a duct and configured to provide the chill air to the one or more galley food and beverage storage compartments. The vent directs the chill air substantially toward the interior of the one or more galley food and beverage storage compartments in the air-through orientation at a first angle, and the vent directs the chill air substantially around the one or more galley food and beverage storage compartments in the air-over orientation at a second angle different from the first angle.

13 Claims, 21 Drawing Sheets

(51) Int. Cl.
*F25D 15/00* (2006.01)
*F25D 17/06* (2006.01)

(56) References Cited

U.S. PATENT DOCUMENTS

| | | | |
|---|---|---|---|
| 7,231,778 | B2 | 6/2007 | Rigney et al. |
| 7,983,039 | B1 | 7/2011 | Nguyen et al. |
| 2005/0210910 | A1* | 9/2005 | Rigney et al. ............. 62/407 |
| 2007/0128999 | A1* | 6/2007 | Komowski ............. 454/155 |
| 2010/0050665 | A1* | 3/2010 | Oswald et al. ............. 62/89 |
| 2010/0224726 | A1 | 9/2010 | Lu et al. |

OTHER PUBLICATIONS

Search Report and Written Opinion issued in related application EP 12827500.5, dated Feb. 18, 2015, 5 pages.

Office Action issued in related application CN 201280048674.8 with English translation, dated Dec. 16, 2014, 9 pages.

* cited by examiner

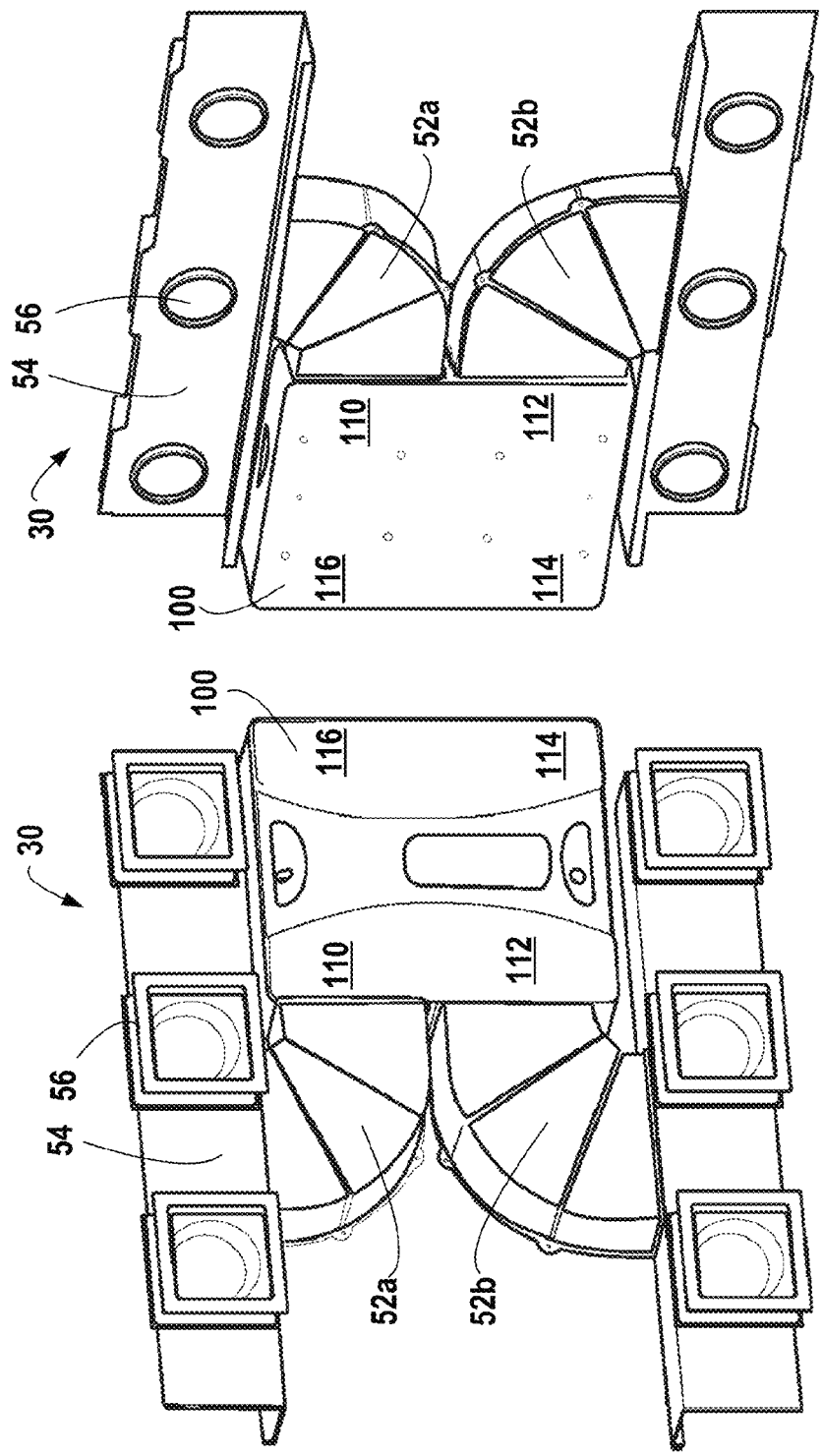

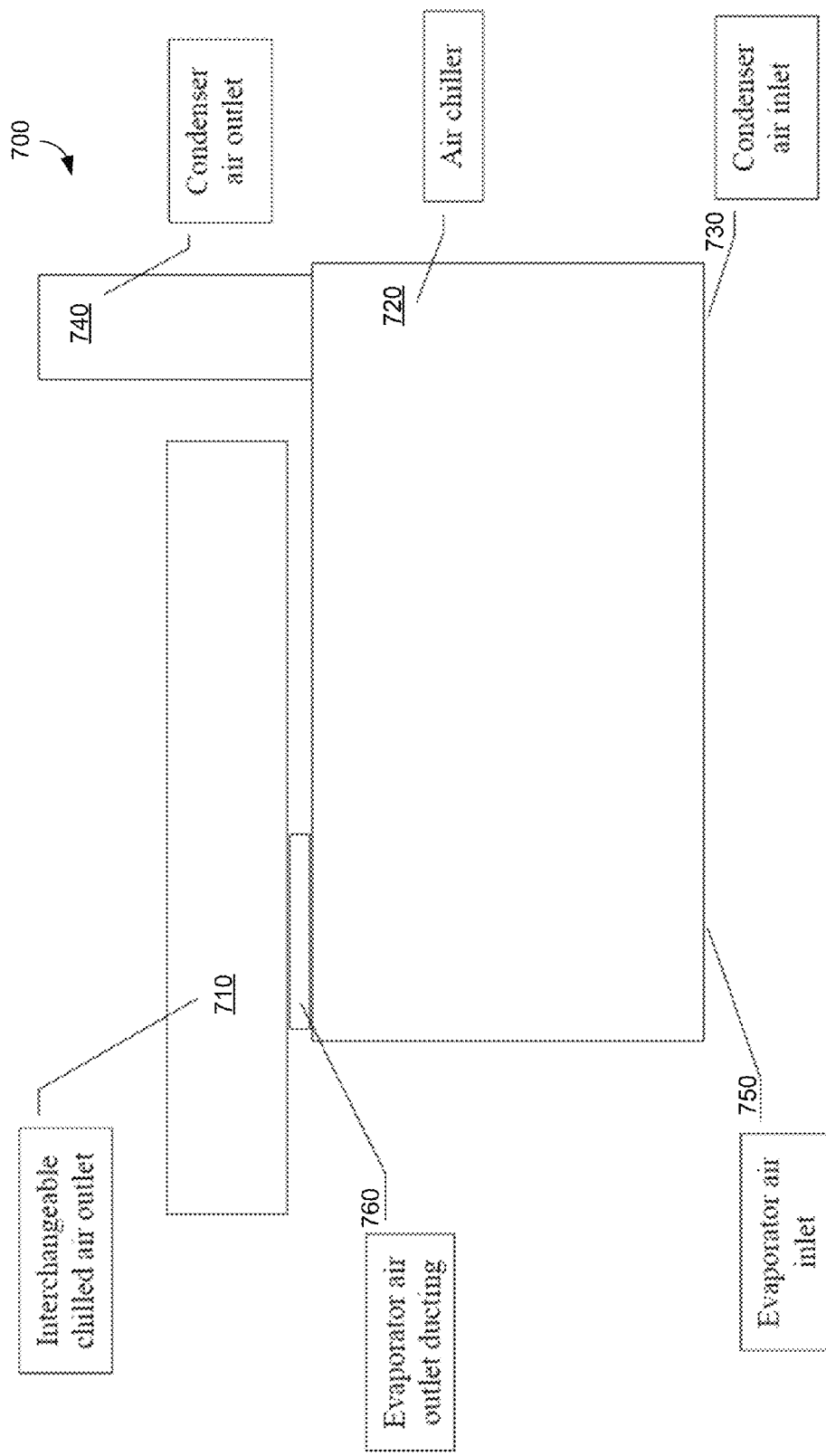

RECONFIGURABLE CHILLED AIR OUTLET FOR AN AIRCRAFT GALLERY CHILLER

RELATED APPLICATION

This application claims the priority benefit of U.S. provisional patent application Ser. No. 61/529,047 filed on Aug. 30, 2011, the disclosure of which is incorporated herein in its entirety by reference.

BACKGROUND

Embodiments relate to refrigeration equipment, and more specifically to equipment for providing and re-circulating chill air to an aircraft galley food service system, and for keeping the temperature of galley food and beverages at the required food storage temperature.

Existing air chiller systems designed for aircraft galley food service systems have fixed vents for providing chill air to galley food carts in galley cart compartments, such that only one type of galley food cart can be used with the air chiller system onboard the aircraft. For example, an aircraft may be equipped with an air chiller system that only interfaces with air-over galley food carts, and therefore, air-through galley food carts may not be used with the air chiller system onboard the aircraft.

SUMMARY

According to various embodiments, a reconfigurable chilled air outlet comprises a duct that couples with an aircraft galley chiller and receives chill air from the aircraft galley chiller, and a vent that provides the chill air to one or more galley food and beverage storage compartment trolleys in parallel, the vent reconfigurable in either of an air-through or an air-over orientation, the vent directing the chill air substantially toward the interior of the one or more galley food and beverage storage compartment trolleys in the air-through orientation at a first angle, and the vent directing the chill air substantially over the interior of the one or more galley food and beverage storage compartment trolleys in the air-over orientation at a second angle different from the first angle. The aircraft galley chiller may be installed locally at the point of use in the aircraft galley, or remote from the galley and in fluid communication with the reconfigurable chilled air outlet via one or more remote chiller ducts. The reconfigurable chilled air outlet results in a more cost-effective and flexible chilling system for the aircraft, since the same chilling system can be utilized with both air-through galley food carts and air-over galley food carts.

Furthermore, an aircraft galley cart compartment may be provided comprising: a cart compartment outer case having a rear and side walls; a reconfigurable chilled air outlet comprising cart vents as described above; and an air chiller unit in fluid communication with the reconfigurable chilled air outlet to deliver chill air to galley carts disposed in the galley cart compartment.

According to an embodiment, a reconfigurable aircraft galley chiller vent system comprises: a first duct in fluid communication with an aircraft galley chiller and configured to receive chill air from the aircraft galley chiller; a first vent in fluid communication with the first duct and configured to provide the chill air to one or more galley food and beverage storage compartments in parallel, the first vent reconfigurable in either of an air-through or an air-over orientation, the first vent directing the chill air substantially toward the interior of the one or more galley food and beverage storage compartments in the air-through orientation at a first angle, and the first vent directing the chill air substantially around the one or more galley food and beverage storage compartments in the air-over orientation at a second angle different from the first angle.

The first vent may comprise: a first housing; and a chilled air outlet assembly removably fastened to the first housing, the chilled air outlet assembly including a vent panel having one or more vent openings through which air flows and a closed panel through which no air flows or substantially less air flows in comparison with the vent panel, an edge of the closed panel adjacent to an edge of the vent panel and disposed at a third angle relative to the vent panel, the third angle being the difference between the first angle and the second angle. When the first vent is configured in the air-through orientation, the vent panel of the chilled air outlet assembly may be installed at a first position of the first housing while the closed panel is installed at a second position of the first housing distinct from and adjacent to the first position, and when the first vent is configured in the air-over orientation, the vent panel of the chilled air outlet assembly may be installed at the second position of the first housing while the closed panel is installed at the first position of the first housing.

The chilled air outlet assembly may further comprise one or more fans installed adjacent to the one or more vent openings and configured to cause air to flow through the one or more vent openings outward from the first vent.

The vent system of claim my further include a second duct in fluid communication with the aircraft galley chiller and configured to provide return air to the aircraft galley chiller; and a second vent in fluid communication with the second duct and configured to receive the return air from the one or more galley food and beverage storage compartments in parallel. The second vent may be reconfigurable in either of an air-through or an air-over orientation, the second vent receiving the return air substantially from the interior of the one or more galley food and beverage storage compartments in the air-through orientation at a first angle, and the second vent receiving the return air from substantially around the one or more galley food and beverage storage compartments in the air-over orientation at a second angle different from the first angle.

The second vent may include a second housing; and a return air inlet assembly removably fastened to the second housing, the return air inlet assembly including a vent panel having one or more vent openings through which air flows and a closed panel through which no air flows or substantially less air flows in comparison with the vent panel, an edge of the closed panel adjacent to an edge of the vent panel and disposed at a third angle relative to the vent panel, the third angle being the difference between the first angle and the second angle. When the second vent is configured in the air-through orientation, the vent panel of the return air inlet assembly may be installed at a first position of the second housing while the closed panel is installed at a second position of the second housing distinct from and adjacent to the first position, and when the second vent is configured in the air-over orientation, the vent panel of the return air inlet assembly may be installed at the second position of the second housing while the closed panel is installed at the first position of the second housing.

The return air inlet assembly may further comprise one or more fans installed adjacent to the one or more vent openings and configured to cause air to flow through the one or more vent openings inward to the second vent.

Each of the one or more galley food and beverage storage compartments may comprise a trolley that moves the respective galley food and beverage storage compartment toward the first vent to establish fluid communication between the first vent and the food and beverage storage compartment, and away from the first vent to disconnect fluid communication between the first vent and the food and beverage storage compartment.

The reconfigurable aircraft galley chiller vent system may further comprise the aircraft galley chiller. The aircraft galley chiller may comprise a generally flattened rectangular case encasing components of a vapor cycle system, the case comprising two main surfaces having a substantially larger surface area than four remaining surfaces of the case. The chiller may also comprise a condenser, a compressor, and an evaporator, wherein the condenser, compressor, and evaporator operate as part of the vapor cycle system to provide chill air to the first duct.

The aircraft galley chiller may be remotely mounted from the one or more galley food and beverage storage compartments, in which case the aircraft galley chiller may comprise a condenser, a compressor, and an evaporator, wherein the condenser, compressor, and evaporator operate as part of a vapor cycle system to provide chill air to the first duct via one or more remote chill air ducts.

The aircraft galley chiller may comprise a liquid to air heat exchanger coupled with a supplemental liquid cooling system that comprises a remote chiller that chills liquid coolant that flows through the liquid to air heat exchanger; and a fan that causes air to flow through the liquid to air heat exchanger to be chilled, wherein the chilled air is provided to the first duct as the chill air.

According to another embodiment, a method of reconfiguring a vent system comprises: configuring a vent to be in fluid communication with an aircraft galley chiller to receive chill air from the aircraft galley chiller or provide return air to the aircraft galley chiller; configuring the vent to be in fluid communication with one or more galley food and beverage storage compartments in parallel in one of an air-through or an air-over orientation, in which the vent is in fluid communication with air in the interior of the one or more galley food and beverage storage compartments in the air-through orientation at a first angle, and the vent is in fluid communication with air substantially around the one or more galley food and beverage storage compartments in the air-over orientation at a second angle different from the first angle; and reconfiguring the vent to be in fluid communication with the one or more galley food and beverage storage compartments in parallel in the other of the air-through or the air-over orientation.

Reconfiguring the vent system may comprise: unfastening a vent opening assembly from a housing of the vent, the vent opening assembly including a vent panel having one or more vent openings through which air flows and a closed panel through which no air flows or substantially less air flows in comparison with the vent panel, an edge of the closed panel adjacent to an edge of the vent panel and disposed at a third angle that is the difference between the first angle and the second angle relative to the vent panel; removing the vent panel from a first position of the housing and removing the closed panel from a second position of the housing distinct from and adjacent to the first position; rotating the vent opening assembly around by about 180 degrees in a plane approximately parallel with a length of the housing such that an interior side of the vent opening assembly remains facing an interior side of the housing; installing the vent panel at the second position of the housing and the installing the closed panel at the first position of the housing; and fastening the rotated vent opening assembly onto the housing of the vent.

The vent may receive chill air from the aircraft galley chiller and cool the one or more galley food and beverage storage compartments by directing the chill air toward or around the one or more galley food and beverage storage compartments.

The vent may provide return air to the aircraft galley chiller by receiving the return air from the interior of or from around the one or more galley food and beverage storage compartments.

The steps of the method may be performed for a chilled air outlet assembly that cools the one or more galley food and beverage storage compartments by directing the chill air toward or around the one or more galley food and beverage storage compartments and the steps may also be performed for a return air inlet assembly that provides return air to the aircraft galley chiller by receiving the return air from the interior of or from around the one or more galley food and beverage storage compartments.

BRIEF DESCRIPTION OF THE DRAWINGS

Exemplary embodiments will be explained in more detail with reference to the attached drawings in which the embodiments are illustrated as briefly described below.

FIGS. 3A and 3B are perspective front and perspective rear views of a mounted air chiller system, according to an embodiment.

FIG. 7A illustrates a chiller system, according to another embodiment.

DESCRIPTION OF THE PREFERRED EMBODIMENTS

Figure 1:
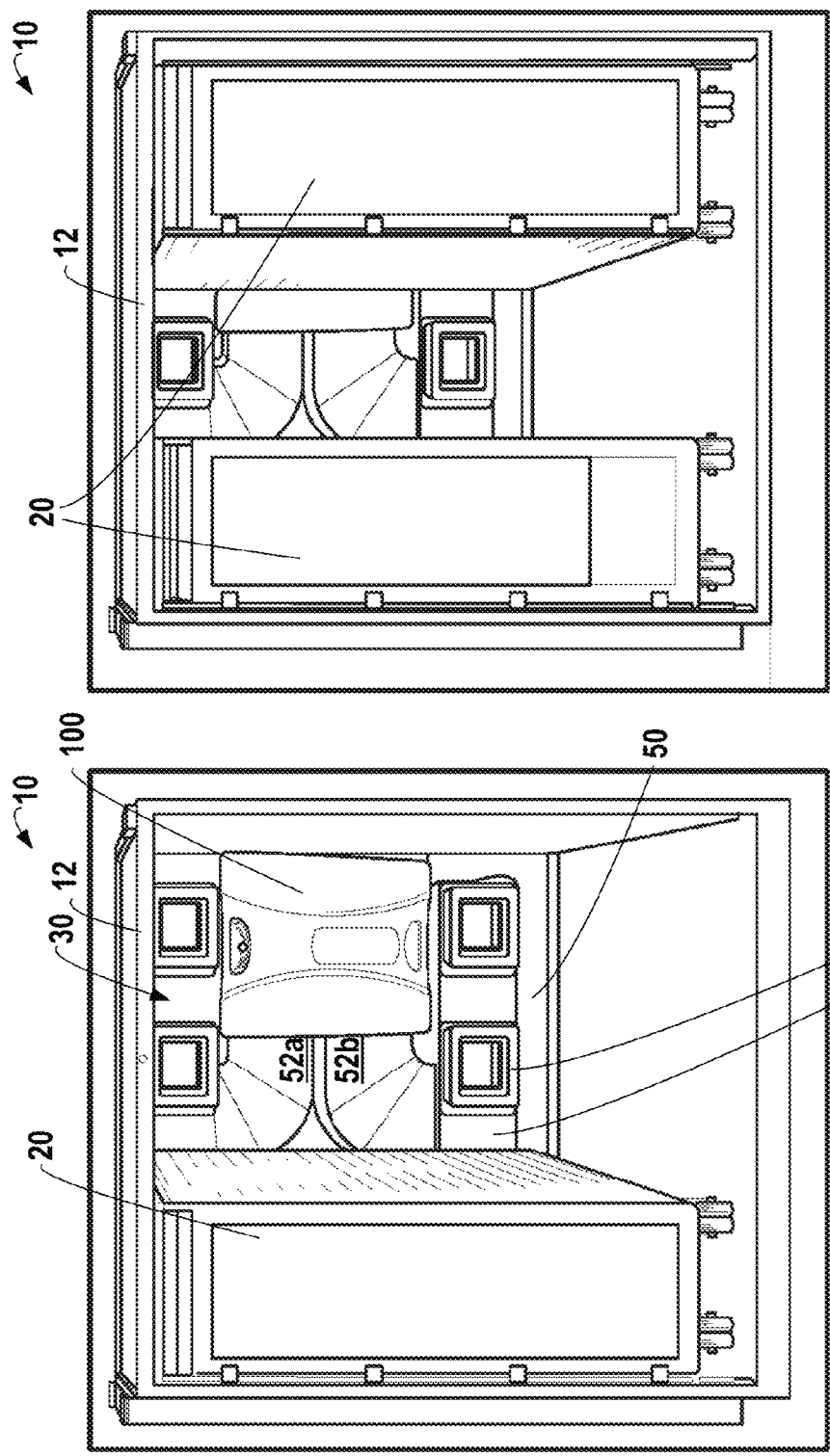
FIGS. 1A and 1B are front views of the chiller system installed within a galley cart compartment area, according to an embodiment.

FIGS. 1A and 1B illustrate an embodiment of an aircraft galley food services system 10 that uses a galley cart compartment 11 for holding one or more galley food carts 20 in an enclosure area bounded by an outer case 12. Such food carts 20 are moved down the aisles of aircraft in order to serve meals and beverages.

In a typical configuration, such a galley compartment 11 is designed to hold a maximum of three carts 20, but such a compartment could be designed to accommodate any number of such carts 20. FIG. 1A shows a single cart 20 within the cart compartment 11, and FIG. 1B shows the compartment 11 with two carts 20.

An embodiment of the air chiller system 30 can be seen mounted at the rear of the cart compartment 11. The chiller system 30 comprises the following main components that are described in more detail below. An air chiller unit 100 comprises the actual refrigeration components, and circulates chilled air via, e.g., an upper duct 52a (used, e.g., for a chilled air supply) and a lower duct 52b (e.g., used for an air return). Each of these ducts 52a and 52b are connected to a cart vent assembly 54 that each comprise a plurality of cart vents 56 that may comprise an interface boot. Each cart 20 may have two corresponding vents (not shown) that interface with a corresponding pair of cart vents 56 on the cart vent assemblies 54 fed by the respective ducts 52a and 52b. In this way, each cart 20 is connected with a chilled air supply and an air return.

However, in the embodiments shown in FIGS. 1A and 1B, the cart vent assemblies 54 comprising the plurality of cart vents 56 are not reconfigurable, but rather are fixed in an air-through orientation.

Figure 2:
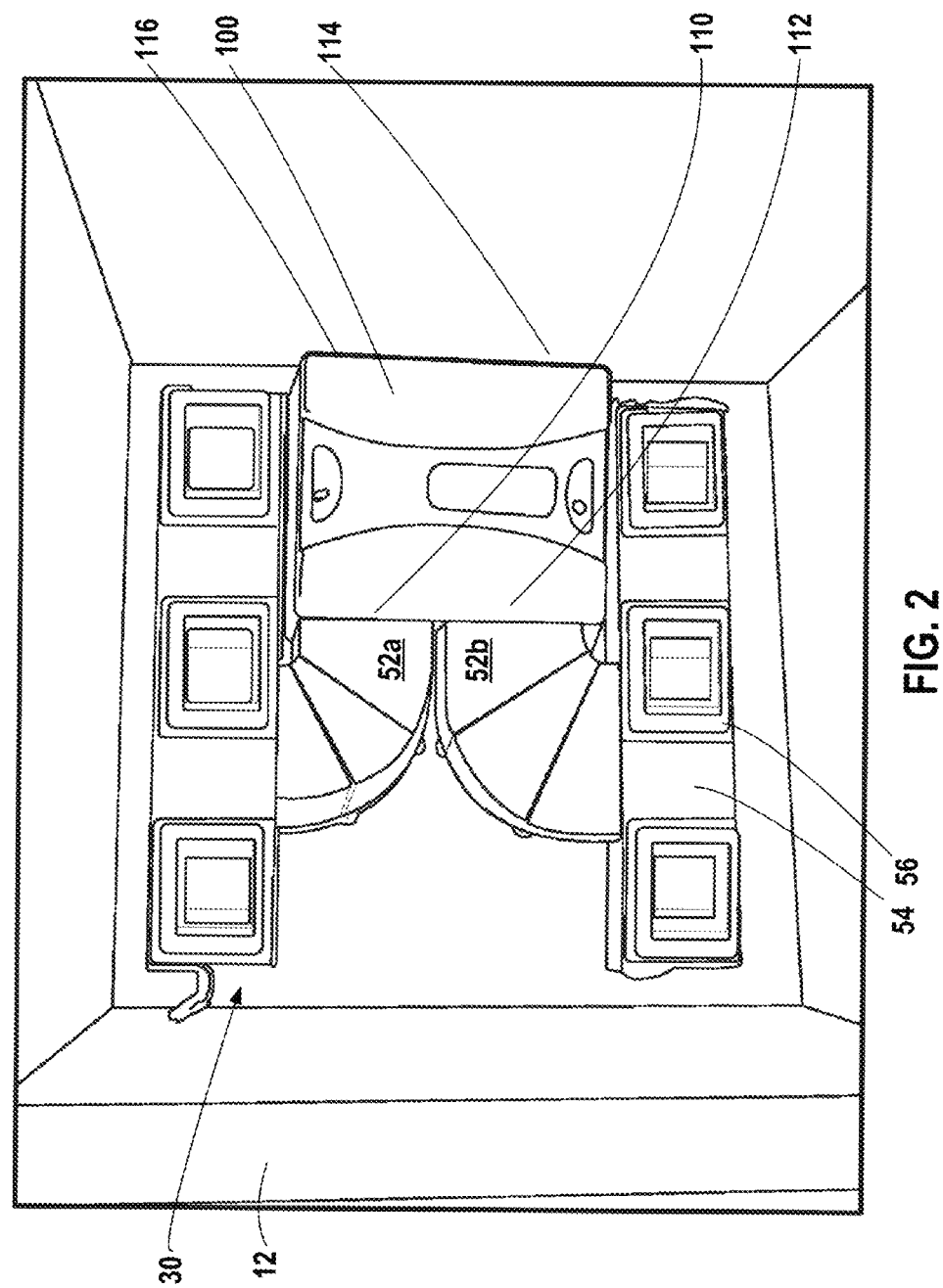
FIG. 2 is a front view of the chiller system installed within the galley cart compartment area with the carts removed, according to an embodiment.

FIG. 2 shows the positioning of the air chiller system 30 within the space of the galley cart compartment 11 in more detail. In this embodiment, the chiller system 30 is affixed to a rear and/or side wall of the cart compartment 11. The width of the chiller system 30 is such that the cart compartment can accommodate both the chiller system 30 along with any carts 20 that are provided. Any known mechanisms may be used to mount the chiller system 30 within the cart compartment 11. As will be discussed in more detail below, the condenser supply 114 and condenser exhaust 116 are interfaced with cutouts in a side wall of the cart compartment 11.

FIGS. 3A and 3B are front and rear perspective illustrations of the air chiller system 30 separated from the cart compartment 11. In these views, the air chiller unit 100 that provides the chilled air can be seen connected to the upper and lower ducts 52a and 52b, that feed respective cart vent assemblies with cart vent boots/vents 56. A chilled supply air vent 110 is connected to the upper duct 52a, and a return air vent 112 is connected to the lower duct 52b.

Figure 4A:
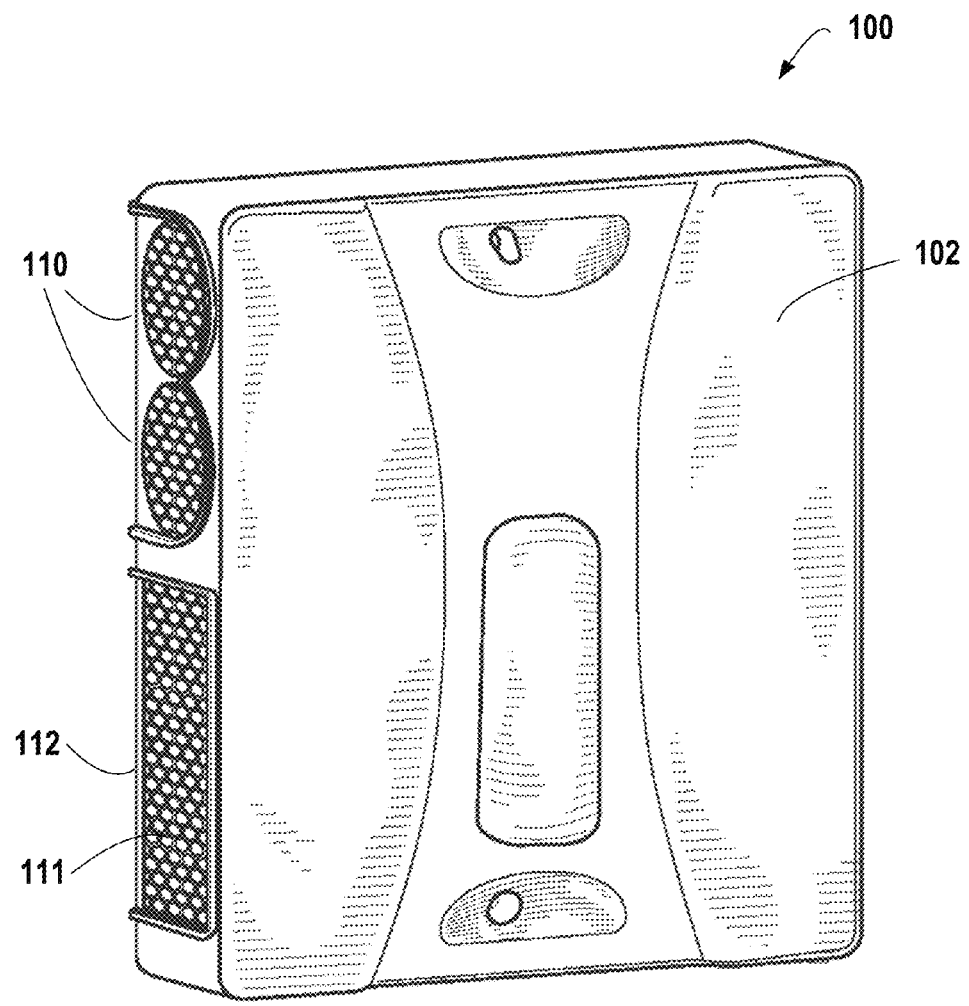
FIG. 4A is a perspective view of the compact air chiller unit, according to an embodiment.
Figure 4B:
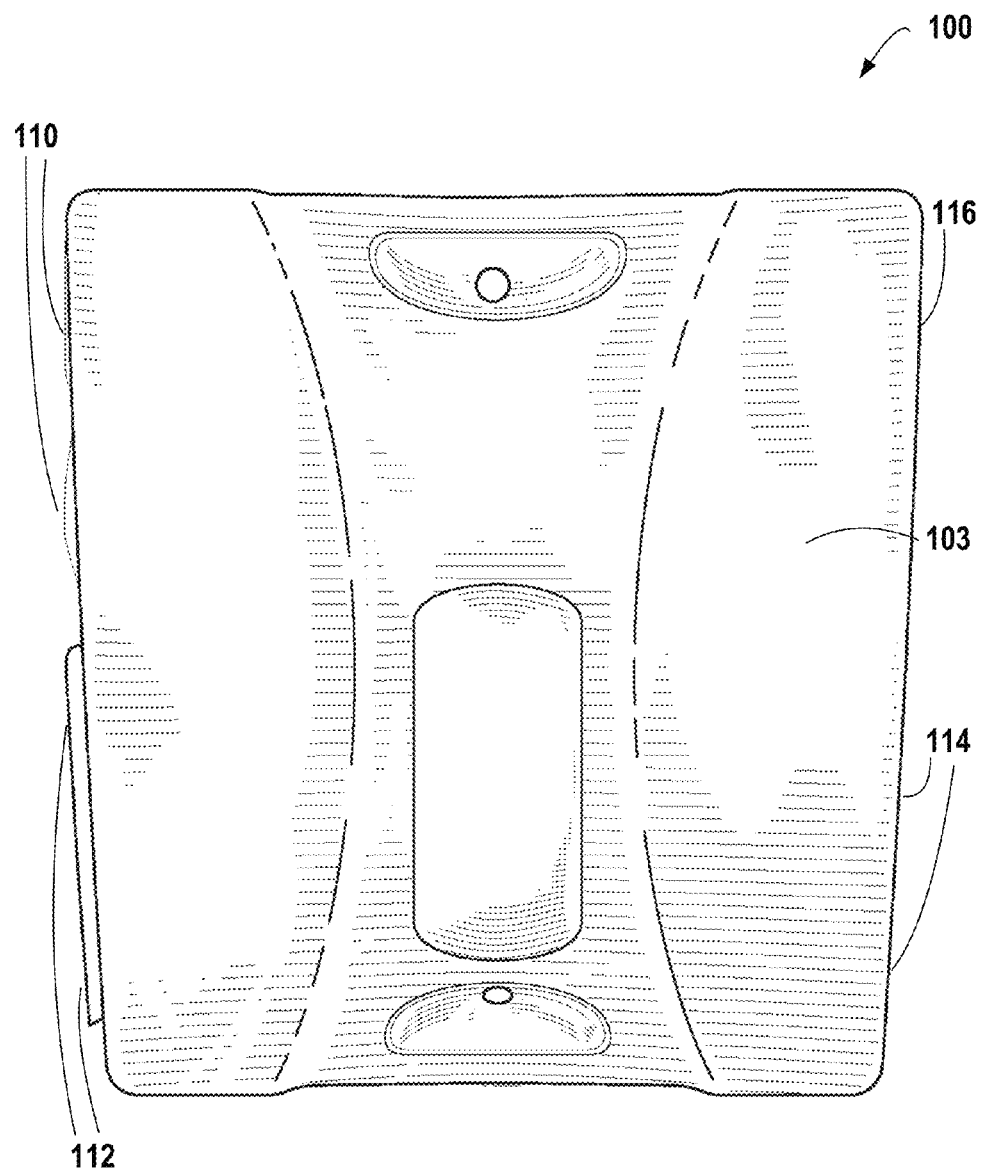
FIG. 4B is a side view of the compact air chiller unit, according to an embodiment.
Figure 4D:
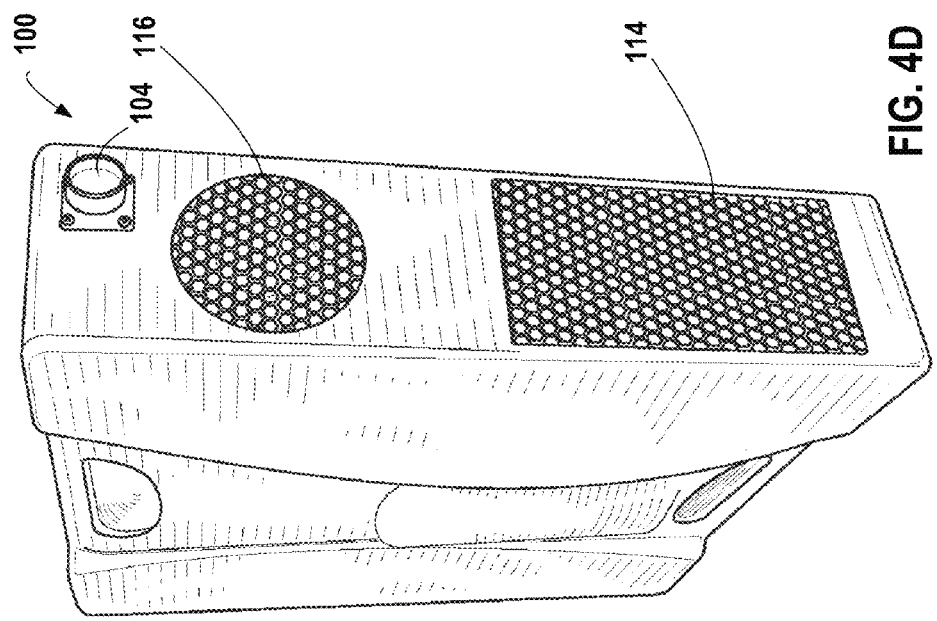
FIGS. 4C and 4D are perspective views of the chiller showing the air flow locations on the unit, according to an embodiment.
Figure 4C:
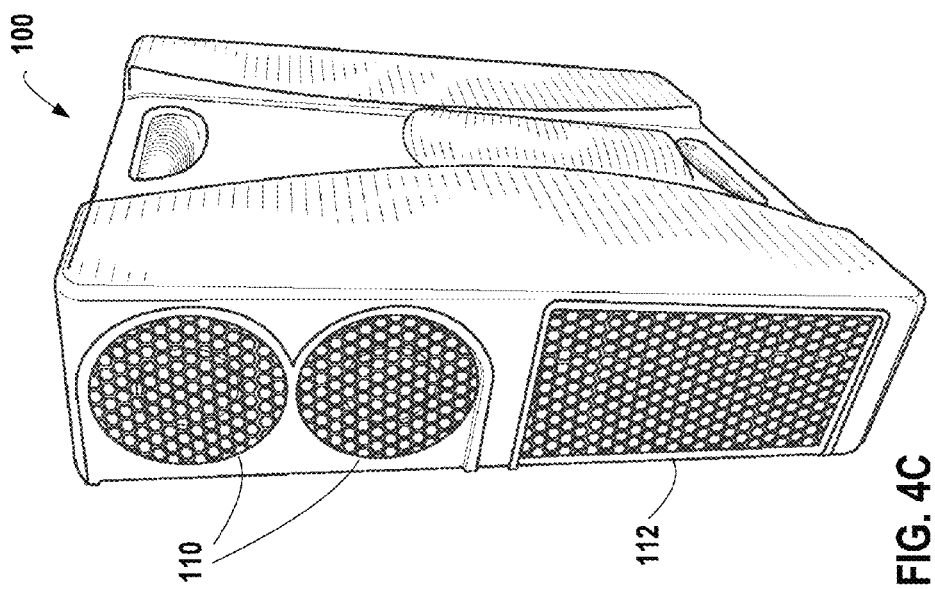

FIGS. 4A, 4B, 4C, and 4D illustrate the air chiller unit 100 in a number of views without any of the ductwork. The unit 100 is enclosed with a suitable case 102. FIG. 4A shows the chilled supply air vents 110 and the return air vent 112, covered with a filter 111. The filters may be provided to ensure that contaminants do not enter the chiller unit 100. FIG. 4B is a side view showing both the supply air 110 and return air 112 vents. It also shows the condenser supply 114 and condenser exhaust 116. FIGS. 4C and 4D are perspective views of the air chiller unit 100.

In various embodiments, air chiller units similar to or dissimilar to the air chiller unit 100 may be utilized to provide chill air to an aircraft galley, and may be mounted at the aircraft galley cart compartment 11 or remote from the cart compartment 11. For example, in some embodiments, a large remote air chiller may provide chill air to a plurality of aircraft galley cart compartments 11 in an aircraft via one or more remote chill air ducts. In various embodiments, fans may be included within or at end points of the remote chill air ducts in order to improve airflow through the remote chill air ducts to the aircraft galley cart compartments 11.

Figure 5:
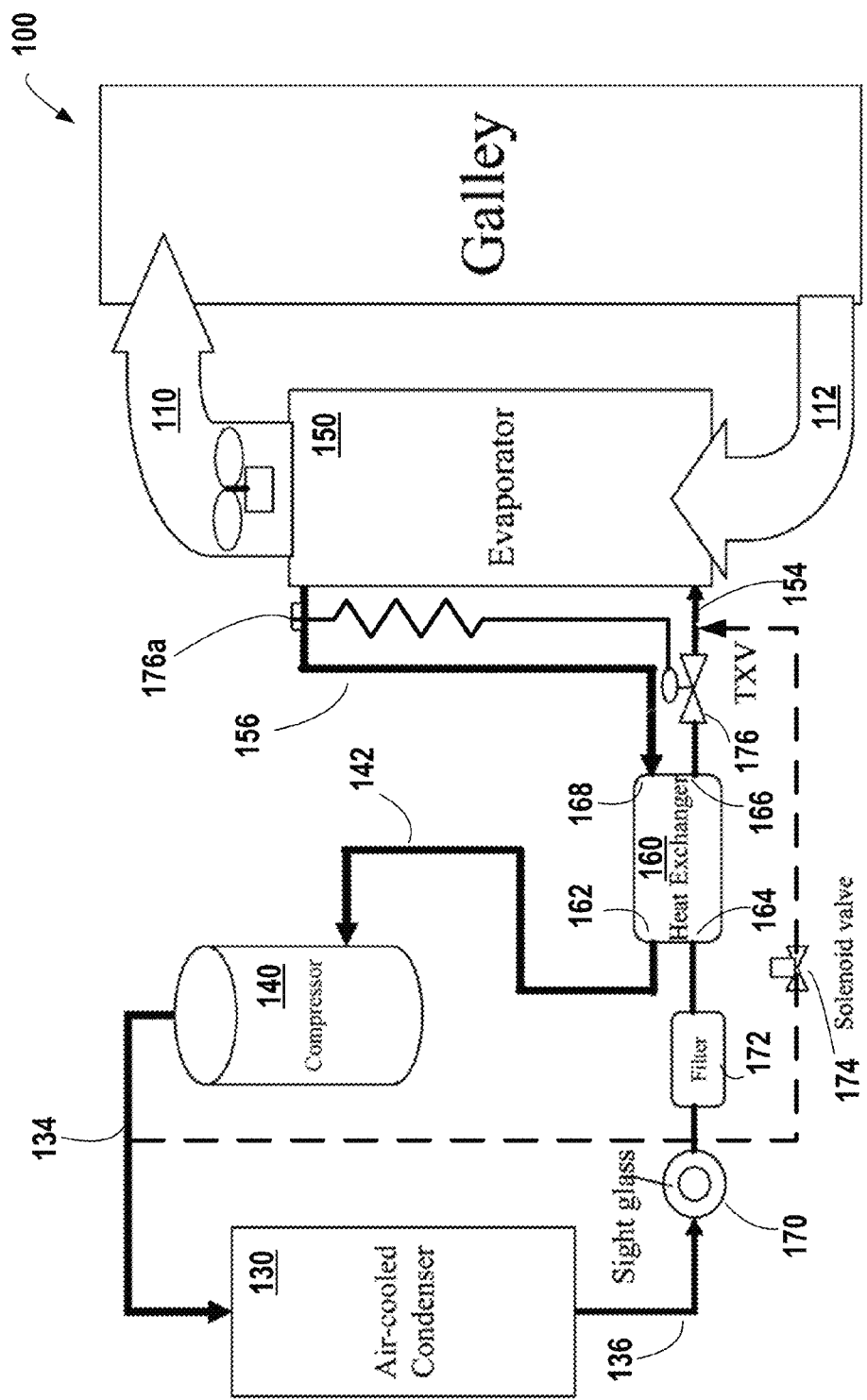
FIG. 5 is a block diagram illustrating the aircraft cooling system, according to an embodiment.

FIG. 5 is a basic block diagram of the air chiller unit 100. Various other embodiments of air chiller units may use similar components configured as shown in FIG. 5. Starting at the compressor 140, the refrigerant is compressed and sent out of the compressor as a high temperature, high pressure, and superheated vapor.

The refrigerant travels from Line 134 to an air-cooled condenser 130 where heat is rejected to a secondary air circuit by a condenser fan. The condenser changes the refrigerant from a high temperature and high pressure vapor to a high pressure sub-cooled liquid.

The refrigerant then travels from Line 136 into refrigerant liquid sight glass 170 and filter-drier 172 where the flow of liquid refrigerant can be monitored and the moisture and solid contaminants and debris are strained out of the refrigerant. It then moves through a vapor to liquid heat exchanger 160, from inlet 164 to outlet 166 where the liquid refrigerant is further sub-cooled by a vapor refrigerant from the evaporator 150.

The refrigerant continues to the Thermal Expansion Valve or TXV 176. The TXV 176 controls the quantity of liquid refrigerant being fed into the evaporator 150. The TXV 176 causes the pressure of liquid refrigerant to be reduced. The TXV 176 regulates the quantity of refrigerant through the evaporator 150 to maintain a preset temperature difference or superheat between the evaporating refrigerant and the vapor leaving the evaporator 150. As the temperature of the gas leaving the evaporator 150 varies, the expansion valve temperature sensing bulb 176a, which is clamped to the outlet tube of the evaporator 150, senses this temperature, and acts to modulate the feed of refrigerant through the TXV 176.

The low temperature and low pressure refrigerant enters the evaporator 150, and heat flows from the galley cooling equipment and/or avionics equipment through the walls of the evaporator 150 into the refrigerant. The boiling process of refrigerant continues until the refrigerant is completely evaporated.

The superheated refrigerant vapor leaving the evaporator 150 travels into the vapor to liquid heat exchanger 160 where the vapor refrigerant is superheated further by the liquid refrigerant. It continues to the compressor suction line 142. The compressor 140 takes this superheated low pressure vapor and compresses it. The refrigerating cycle is continuous as long as the compressor is operating.

The hot gas bypass solenoid valve or defrost valve 174 is used to stabilize the refrigeration system at compressor starting, and to control the cooling output of the refrigeration system by allowing hot gas to warm up the cool evaporator 150. This causes a reduction in cooling efficiency and a stabilizing of the chilled air temperatures.

The refrigeration cycle results in frost formation on the surface of the evaporator 150. This frost may eventually build up to the point where it will restrict the air flow causing a loss of refrigeration capacity. To prevent this, the defrost valve 174 will be energized or opened to initiate a defrost cycle which melts the frost. Once all of the frost has melted and the moisture has drained away, the system will then resume the refrigeration cycle.

Figure 6A:
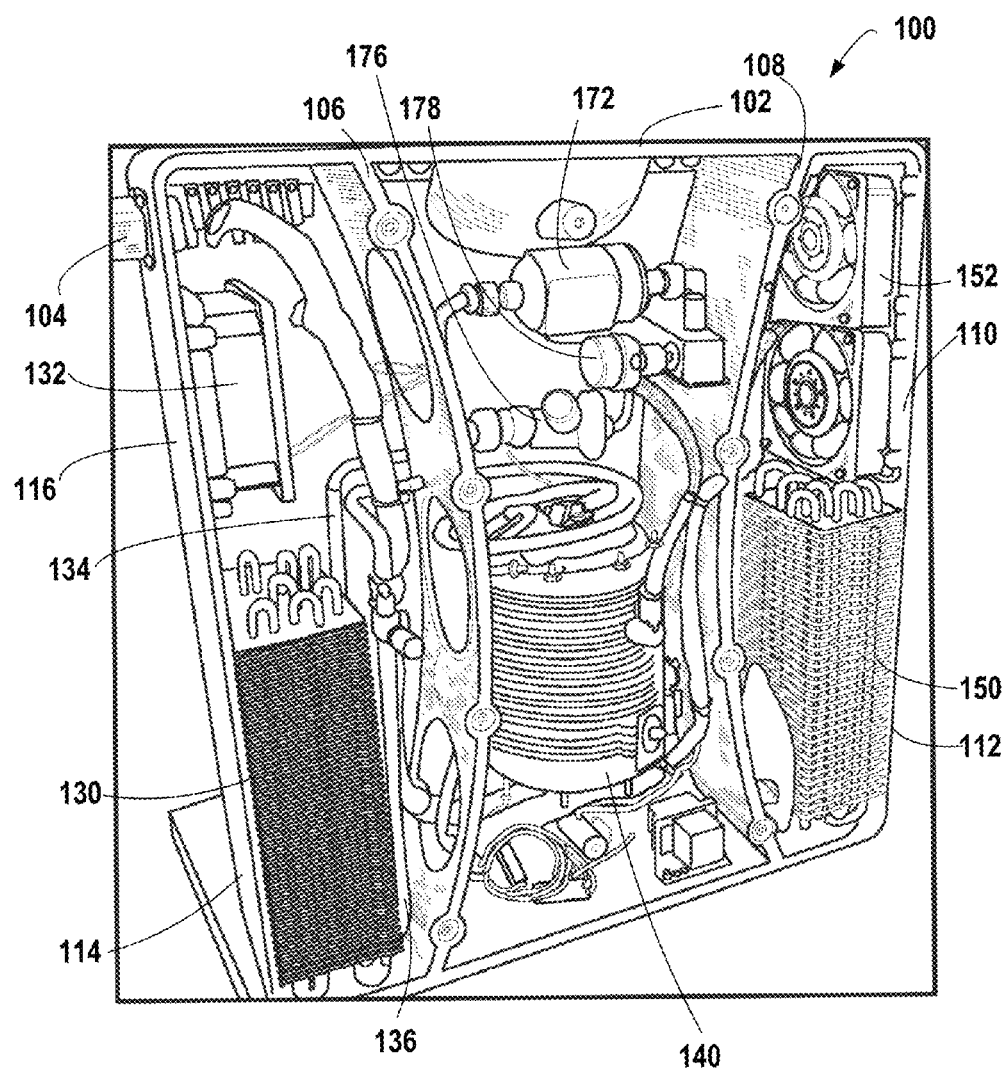
FIG. 6A is a perspective view of the chiller with cover removed showing the interior components, according to an embodiment.
Figure 6C:
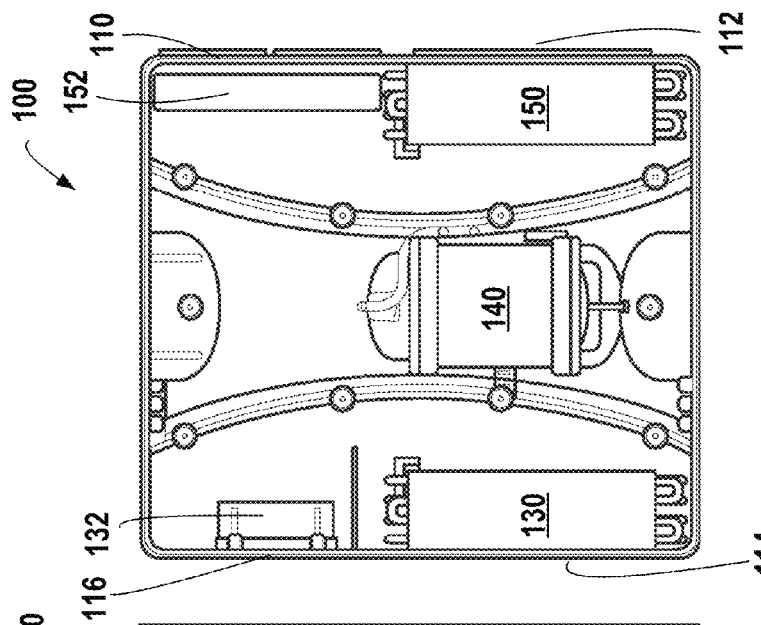
FIG. 6C is a front view of the interior components, according to an embodiment.
Figure 6B:
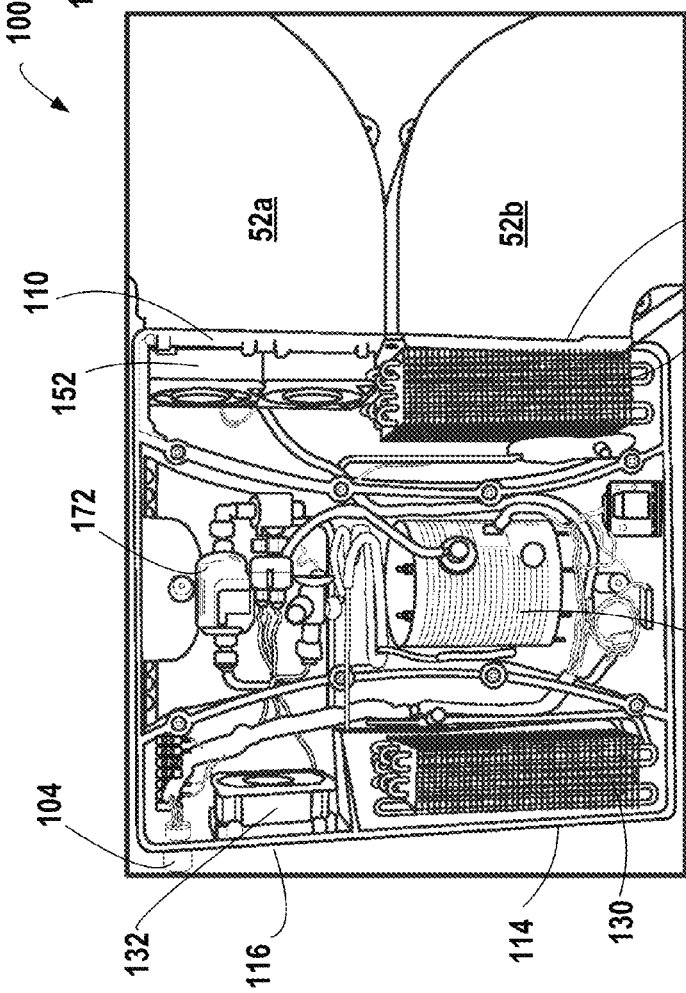
FIG. 6B is a front view of the chiller with cover removed and showing the attached duct work, according to an embodiment.

FIGS. 6A-6C show an exemplary placement of the chiller unit 100 components. The chiller unit 100 as a whole preferably has a flattened rectangular block shape in which all of the components are sized and mounted to fit within this bounded region enclosed by the case 102. In an embodiment, the chiller unit 100 has a width of approximately 24", a height of approximately 20", and a depth of approximately 4".

The chiller unit 100 has two main surfaces 103 each comprising a substantially greater area than the remaining four surfaces, where one of the greater area surfaces is designed to be adjacent to a back wall of the galley cart compartment. The layout of the components is in a generally flattened configuration such that a plane parallel to the main surfaces cuts through the condenser 130, the condenser fan 132, the compressor 140, the evaporator 150, and the evaporator fan 152.

In this embodiment, the condenser 130 is located in a lower bottom left corner (according to the FIG. 6A view) of the chiller unit 100. Ambient air is pulled through the condenser 130 via a vacuum created by the condenser fan 132, located above the condenser 130 and connected adjacent to the condenser exhaust 116, which vents heated air into other parts of the aircraft outside of the galley cart compartment 11. This causes the heated pressurized refrigerant to condense into a liquid.

The compressor 140 is located in a lower central region of the air chiller unit 100. The control circuitry, valves 174, 176, safety switches 178, and the like are located primarily above the compressor 140, which are situated in a compartment bounded by a first unsealed case partition 106 that permits heat created by the compressor 140 and associated components to be exhausted out of the condenser exhaust 116 via the condenser fan 132. The compressor 140 is also bounded by a generally second sealed case partition 108 that isolates the evaporator 150 and evaporator fans 152 to prevent heat generated within the unit 100 from entering the galley cart compartment 11.

In an embodiment, the chiller unit 100 meets the following table of performance requirements:

TABLE 1

POU Performance Requirements

| | | IP Unit | | SI Unit | |
|---|---|---|---|---|---|
| | | | POU-A3 | | POU-A3 |
| Air-Cooling Processes | | | | | |
| Ambient Temperature | Air | ° F. | 85 | ° C. | 29.4 |
| Chiller return air temperature | Air | ° F. | 39.2 | ° C. | 4.0 |
| Chiller supply air temperature | Air | ° F. | 30 | ° C. | −1.1 |
| Moisture content | Air | % | 85 | % | 85.0 |
| Evaporator air flow | Air | CFM | 202 | Liter/Sec | 95.3 |
| Evaporator fan pressure drop | Air | inH2O | 1 | mbar | 2.5 |
| Cooling capacity of chiller | Air | Btu/h | 2150 | w | 629.7 |
| Refrigeration System | | | | | |
| Evaporating pressure | Refrigerant | Psia | 31.8 | Bar | 2.2 |
| Evaporating temperature | Refrigerant | ° F. | 18.1 | ° C. | −7.7 |
| Cooling capacity | Refrigerant | Btu/h | 2266 | w | 663.7 |
| Condensing pressure | Refrigerant | Psia | 185.9 | Bar | 12.8 |
| Condensing temperature | Refrigerant | ° F. | 120 | ° C. | 48.9 |
| Condenser air flow | Air | CFM | 135 | Liter/Sec | 63.7 |
| Condenser fan pressure drop | Air | inH2O | 0.50 | mbar | 1.2 |
| Condenser heat rejection | Refrigerant | Btu/h | 3714 | w | 1087.7 |
| Chiller discharge air temperature | Air | ° F. | 120.6 | ° C. | 49.2 |
| Power and COP | | | | | |
| Evaporator fan | Air | w | 67.8 | w | 67.8 |
| Condenser Fan | Air | w | 22.7 | w | 22.7 |

TABLE 1-continued

| POU Performance Requirements | | | | | | |
|---|---|---|---|---|---|---|
| | | | IP Unit | | SI Unit | |
| | | | POU-A3 | | POU-A3 | |
| Compressor | Refrigerant | w | 593 | w | 593 | |
| Liquid | pump | PGW | w | w | 0 | |
| Total Power Consumption | | w | 683.5 | w | 683.5 | |
| COP | | | 0.92 | | 0.92 | |

Thus, the air chiller system 30 is a compact space and weight saving unit that is designed to maximize cooling capacity for up to, e.g., four trolley carts in an aircraft galley food service system 10. Due to its thin (shallow depth) design, it fits behind traditional galley cart ducting for a chilled galley compartment. Due to its close proximity to the galley carts, it eliminates the long chilled air supply ducts typically associated with remotely mounted air chiller units.

The light-weight (approximately 20 lbs.) compact design for this embodiment maximizes cooling capacity in a small space and represents a weight savings over traditional equivalently performing 40 lb. units. The unit may use less than 700 watts of power.

In other embodiments of the compact air chiller system 30, air may be exhausted upward, or downward. In further embodiments, the compact air chiller unit 100 is capable of a reverse mount, such that the supply air and the return air may be received/sent to the other side. This allows for flexible installations and galley ducting locations. In still another embodiment, the condenser air fan 132 may be mounted in a remote location, upstream in the exhaust duct to reduce, minimize, or eliminate condenser air noise. Baffling techniques may also be used to eliminate condenser air noise. The compact air chiller system 30 may also have reversible fans for optimized cooling load balance.

FIG. 7A illustrates a chiller system 700, according to another embodiment. The chiller system 700 may be similar to the chiller system 30, except for the notable difference that the cart vent assembly 54 of the chiller system 30 is replaced by a reconfigurable or interchangeable chilled air outlet 710 in the chiller system 700. The air chiller 720 may be substantially similar to the air chiller unit 100, the condenser air inlet 730 may correspond to the condenser supply 114, the condenser air outlet 740 may correspond to the condenser exhaust 116, the evaporator air inlet 750 may correspond to the return air vent 112, and the evaporator air outlet ducting 760 may correspond to the upper duct 52*a* attached to the chilled air supply vent 110. The chiller system 700 is shown with a point-of-use air chiller 720 installed at the rear wall of the galley cart compartment 11', but this should not be construed as limiting, as the chiller system 700 may be installed in a variety of other configurations.

Figure 7B:
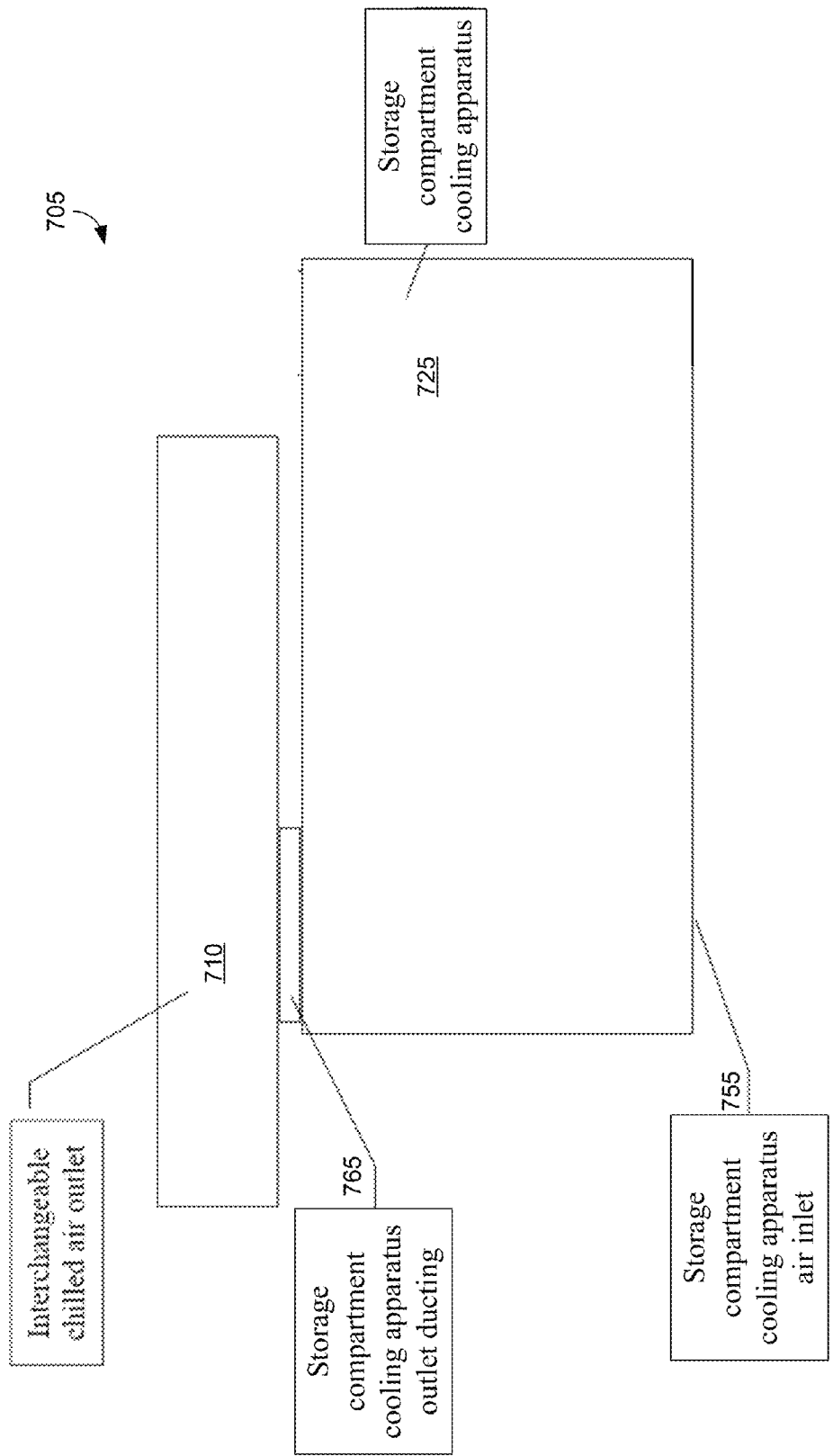
FIG. 7B illustrates a chiller system, according to another embodiment.

FIG. 7B illustrates a chiller system 705, according to another embodiment. The chiller system 705 is shown with a point-of-use storage compartment cooling apparatus 725 installed at the rear wall of the galley cart compartment 11', but this should not be construed as limiting, as the chiller system 705 may be installed in a variety of other configurations. The storage compartment cooling apparatus 725 provides chill air to the interchangeable chilled air outlet 710 via storage compartment cooling apparatus outlet ducting 765. The storage compartment cooling apparatus 725 provides receives return air via storage compartment cooling apparatus air inlet 755. Chill air from the storage compartment cooling apparatus 725 may exit the interchangeable chilled air outlet 710, circulate through or over galley carts 20 in the galley cart compartment 11, and then return to the storage compartment cooling apparatus 725 via the storage compartment cooling apparatus air inlet 755. The storage compartment cooling apparatus 725 may comprise a liquid to air heat exchanger coupled with a supplemental liquid cooling system of the aircraft. The supplemental liquid cooling system may comprise a remote chiller that chills liquid coolant that is circulated through the aircraft to various point of use cooling apparatuses including the storage compartment cooling apparatus 725.

Figure 7C:
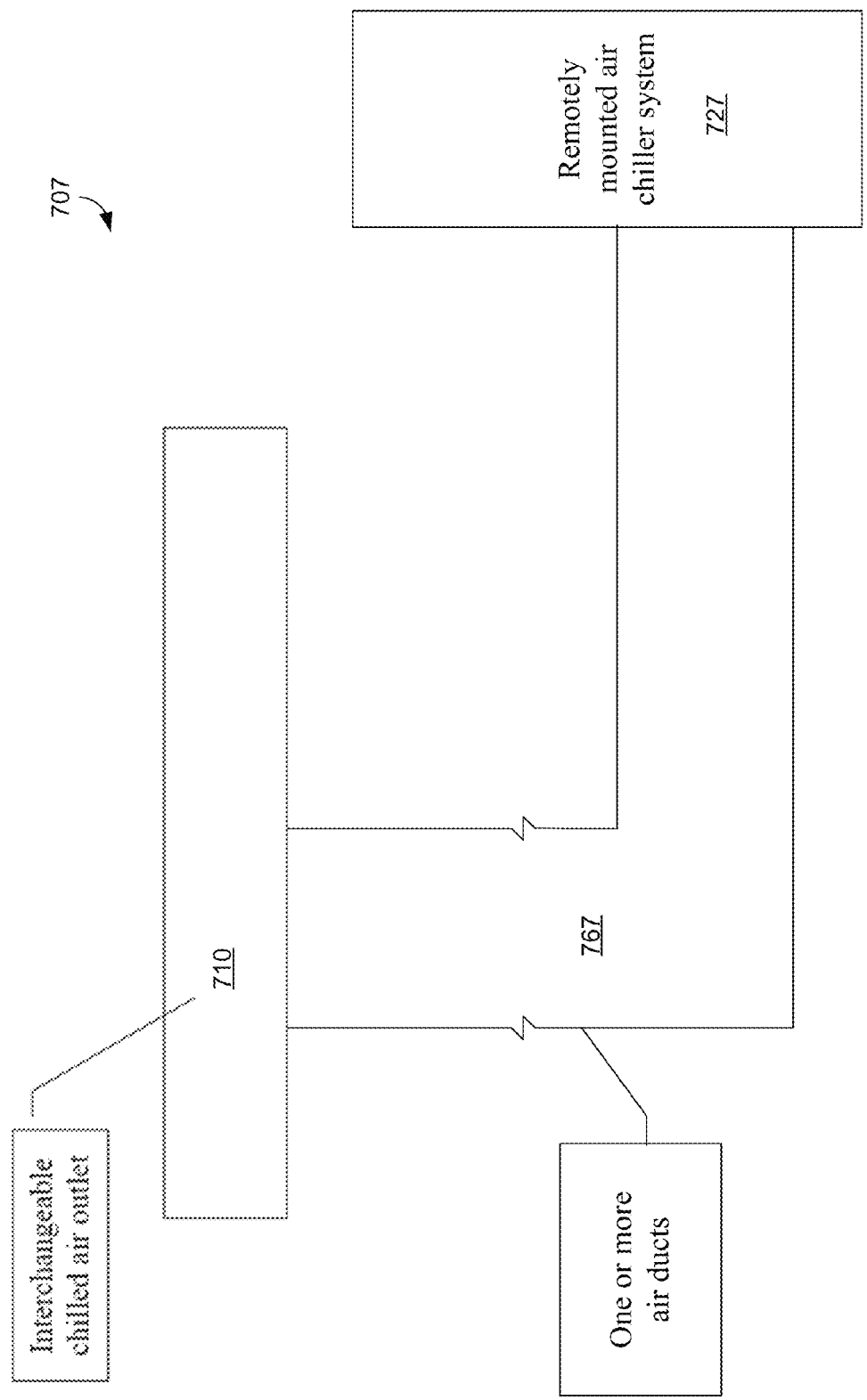
FIG. 7C illustrates a chiller system, according to another embodiment.

FIG. 7C illustrates a chiller system 707, according to another embodiment. The chiller system 707 comprises a remotely mounted air chiller system 727 that provides chill air to the reconfigurable or interchangeable chilled air outlet 710 via one or more air ducts 767. In various embodiments, the chiller system 707 may receive return air through the one or more air ducts 767 as well. Thus, the one or more air ducts 767 may comprise one or more remote chill air ducts and remote return air ducts. The remotely mounted air chiller system 727 may be a vapor cycle system, an air chiller including a liquid to air heat exchanger coupled with a supplemental liquid cooling system of the aircraft, or other air chilling system as known in the art.

Figure 8A:
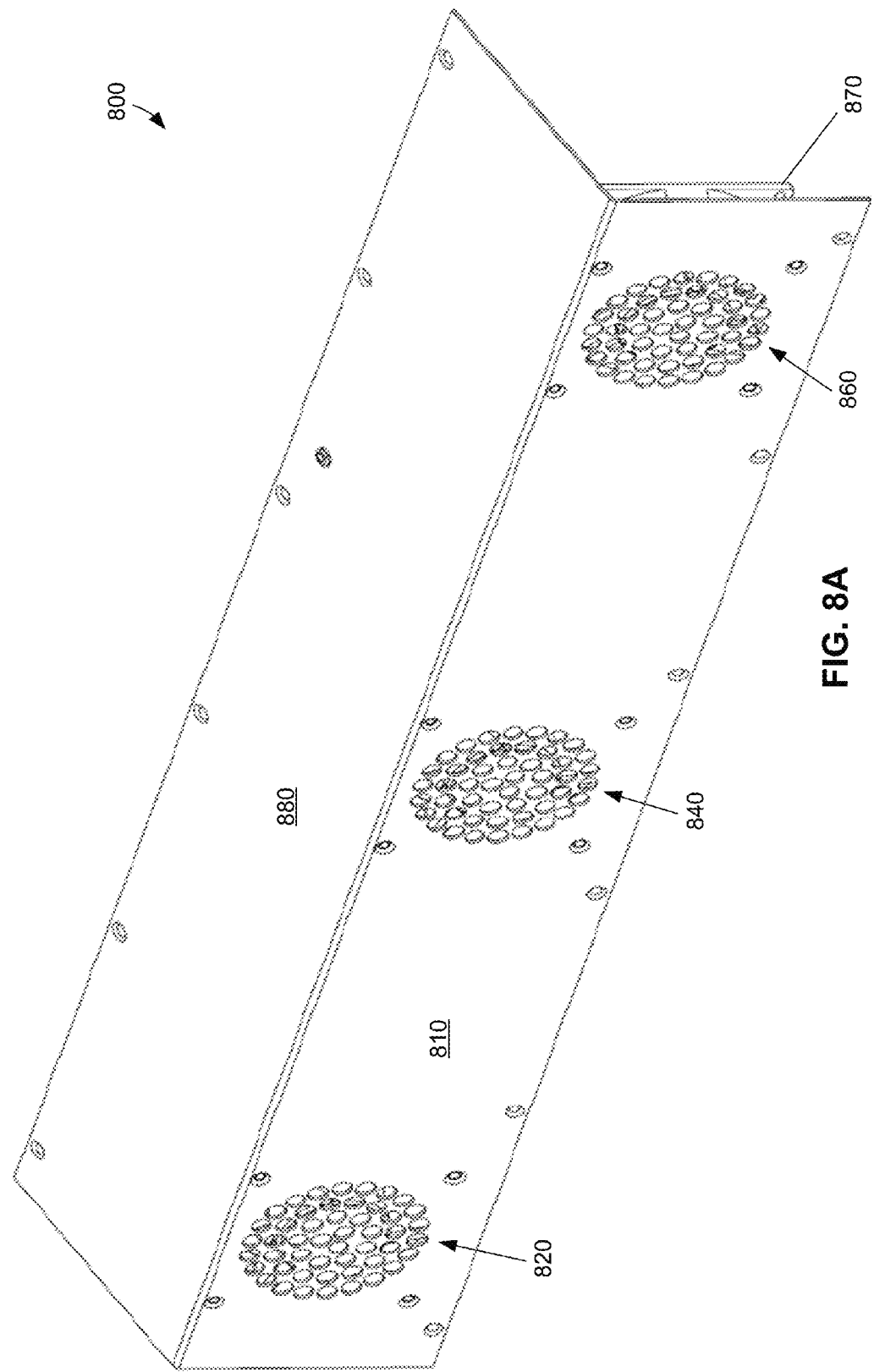
FIG. 8A illustrates an exterior perspective view of a reconfigurable chilled air outlet assembly, according to an embodiment.
Figure 8B:
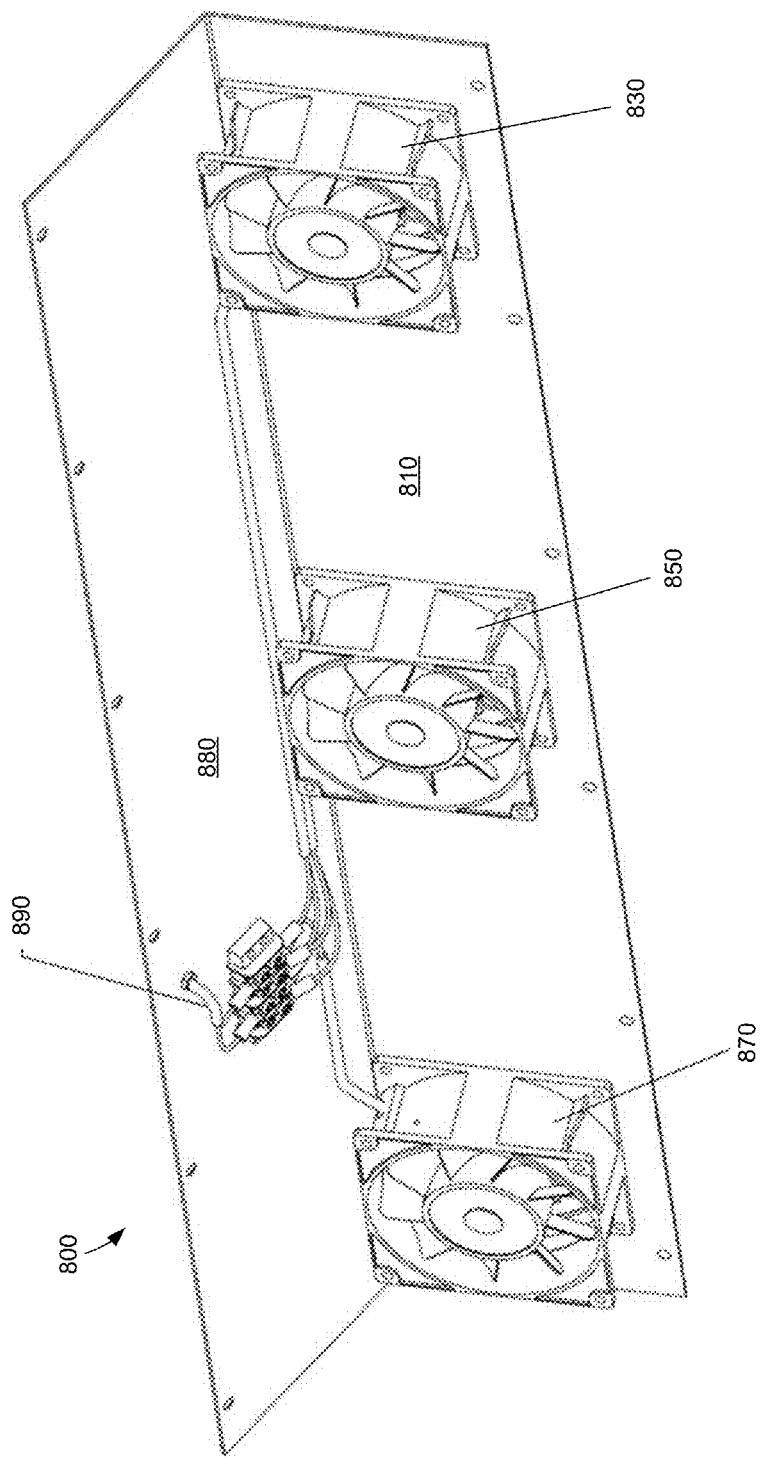
FIG. 8B illustrates an interior perspective view of the reconfigurable chilled air outlet assembly of FIG. 8A, according to an embodiment.

FIG. 8A illustrates an exterior perspective view of a reconfigurable chilled air outlet assembly 800, according to an embodiment. FIG. 8B illustrates an interior perspective view of the reconfigurable chilled air outlet assembly 800, according to an embodiment. The reconfigurable chilled air outlet assembly 800 may be included in the interchangeable or reconfigurable chilled air outlet 710. In some embodiments, a reconfigurable air return inlet assembly 800' may be substantially similar in construction and performance to the reconfigurable chilled air outlet assembly 800, but configured to support airflow in a direction opposite to that of the reconfigurable chilled air outlet assembly 800. The reconfigurable chilled air outlet assembly 800 and the reconfigurable air return inlet assembly 800' are collectively referred to herein as the vent opening assemblies. The reconfigurable chilled air outlet assembly 800 includes a vent panel 810 that includes three vent openings 820, 840, and 860, each of which may mate with a galley food cart 20 in either an air-through or air-over configuration, depending on how the reconfigurable chilled air outlet assembly 800 is installed in the interchangeable or reconfigurable chilled air outlet 710. Behind a grill of each of the vent openings 820, 840, and 860, the reconfigurable chilled air outlet assembly 800 may include a fan 830, 850, and 870, respectively. Each of the fans 830, 850, and 870 may be axial fans configured to blow air through the associated vent opening 820, 840, or 860 toward the galley food cart 20 positioned in front of the associated vent opening 820, 840, or 860. In embodiments where the reconfigurable air return inlet assembly 800' is used in conjunction with an air return duct, the fans 830, 850, and 870 may be configured to direct air in an opposite direction than when the reconfigurable chilled air outlet assembly 800 is used in conjunction with a chill air supply duct. In some embodiments, the reconfigurable chilled air outlet assembly 800 may not include the fans 830, 850, and 870, because fans provided elsewhere, such as within associated ducts or within the associated air chiller, provide the required airflow through the associated vent openings 820, 840, and 860.

A closed panel 880 may be attached to the vent panel 810 along a shared long edge at an angle, such as a 135 degree angle. In various embodiments, the closed panel may not have vent openings and may not permit air to flow therethrough. However, this should not be construed as limiting, as in some embodiments, the closed panel 880 may not be entirely closed, but may include some openings, although the close panel 880 may be configured to permit substantially less airflow through the closed panel 880 than is permitted through the vent panel 810. For example, substantially less airflow may include no airflow, 10% of the airflow relative to the vent panel 810, 25% of the airflow relative to the vent panel 810, 50% of the airflow relative to the vent panel 810, 75% of the airflow relative to the vent panel 810, or other substantially less amount of airflow as may be discernable by one of ordinary skill in the art. The angle may be different in various embodiments, for example, at any value within a range of approximately 15 degrees to 165 degrees. Widths of an exterior surface of each of the closed panel 880 and vent panel 810 from the shared long edge to an opposite long edge may be substantially equal. In this way, a same embodiment of the reconfigurable chilled air outlet assembly 800 may be installed in the interchangeable or reconfigurable chilled air outlet 710 in either an air-through configuration in which the vent openings 820, 840, and 860 direct air horizontally outward from the chilled air outlet 710, or in an air-over configuration in which the vent openings 820, 840, and 860 direct air substantially upward from the chilled air outlet 710. Fastener holes in each of the closed panel 880 and vent panel 810 may be positioned in substantially identical locations such that the reconfigurable chilled air outlet assembly 800 may be fastened, for example, using fastening elements such as screws, clips, pins, hooks, and the like, to the chilled air outlet 710 in either the air-through configuration or air-over configuration using the same fastener holes or mechanisms in the chilled air outlet 710. Fastening may also be performed using friction or magnetic attraction, in various embodiments. In some embodiments, fastener holes and associated fastener mechanisms may not be required to perform the fastening, as friction or removable adhesive may provide sufficient fastening strength.

A power connector 890 may couple power to the fans 830, 850, and 870. Each of the fans 830, 850, and 870 may be independently powered by a separate power connection through the power connector 890. The fans 830, 850, and 870 may be controlled by the air chiller system 700, 705, or 707 to only run when a galley food cart 20 is positioned in front of the associated vent opening 820, 840, or 860, when the air chiller system 700, 705, or 707 is operating, and/or when a temperature of the interior of the associated galley food cart 20 is above a desired temperature.

Figure 9:
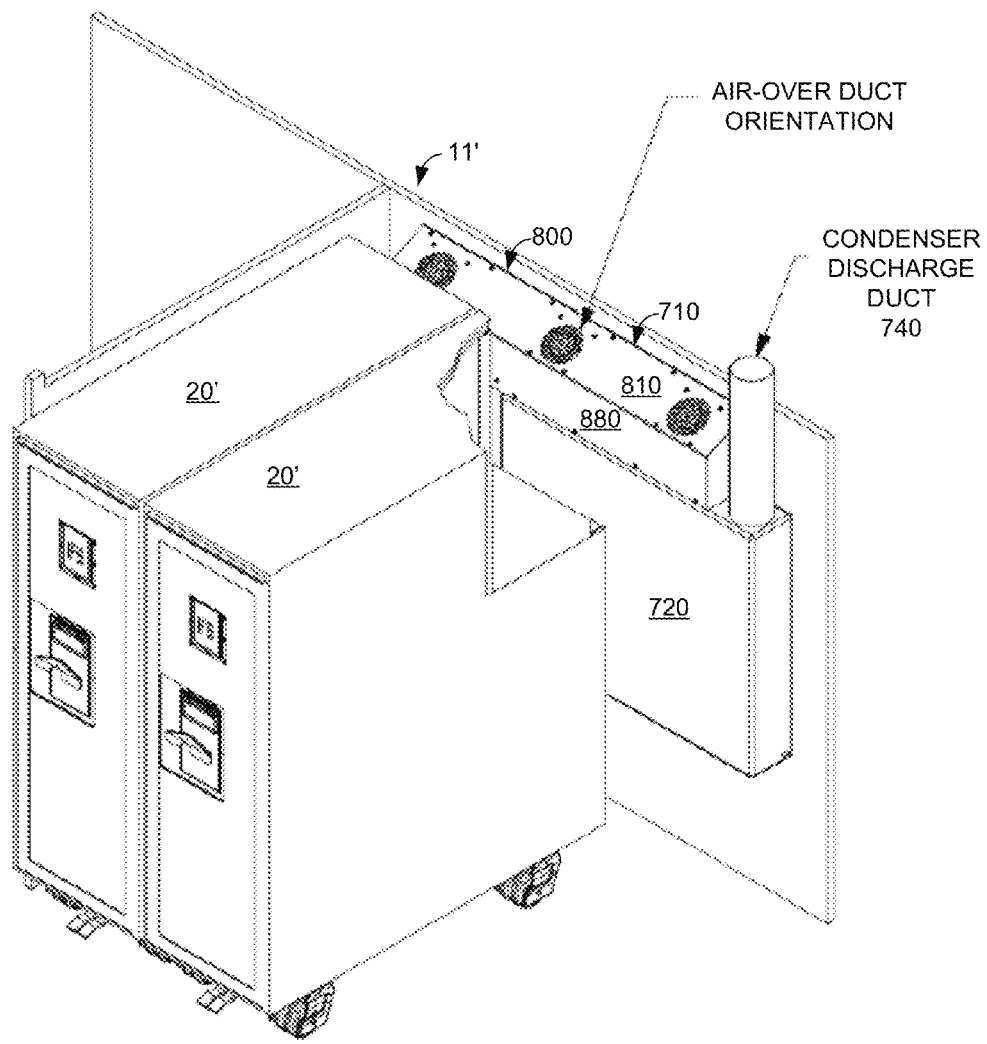
FIG. 9 illustrates a perspective view of the chiller system of FIG. 7 installed in an air-over duct orientation within a galley cart compartment area, according to an embodiment.

FIG. 9 illustrates a perspective view of the chiller system 700 installed in an air-over duct orientation within a galley cart compartment area 11', according to an embodiment. The galley cart compartment area 11' may be an embodiment of the galley cart compartment area 11. Galley food carts 20', which may be embodiments of the galley food carts 20, may be removably disposed in front of the chiller system 700 within the galley cart compartment area 11'. The galley food carts 20' may be configured to interface with vents of a chilled air outlet in an air-over duct orientation as illustrated in FIG. 9.

FIGS. 10A, 10B, 10C, 10D, and 10E illustrate a method of reconfiguring the air chiller system 700 from an air-over duct orientation as illustrated in FIG. 9 to an air-through duct orientation, according to an embodiment. The reconfigurable chilled air outlet assembly 800 is configured to be in fluid communication with the air chiller 720 to receive chill air from the air chiller 720.

Figure 10A:
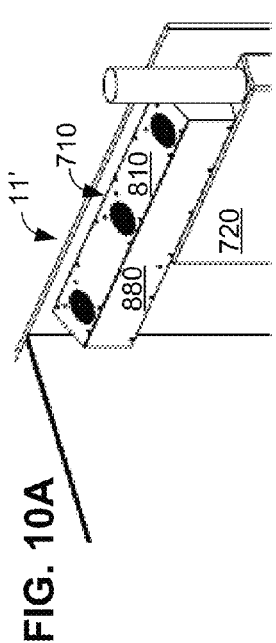
FIGS. 10A, 10B, 10C, 10D, and 10E illustrate a method of reconfiguring the air chiller system from an air-over duct orientation as illustrated in FIG. 9 to an air-through duct orientation, according to an embodiment.

FIG. 10A illustrates the reconfigurable chilled air outlet assembly 800 in the air-over duct orientation as also illustrated in FIG. 9. In the air-over duct orientation, the vent openings 820, 840, and 860 are oriented in an upward direction such that chill air is blown by the fans 830, 850, and 870, respectively, substantially upward and over the galley food carts stored in the galley cart compartment 11'. In this configuration, the reconfigurable chilled air outlet assembly 800 is in fluid communication with air substantially around galley food and beverage storage compartments of the galley food carts in parallel.

Figure 10B:
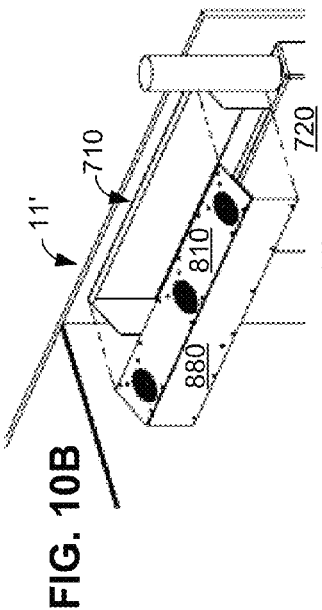

FIG. 10B illustrates a first step in reconfiguring the air chiller system 700 as removing the reconfigurable chilled air outlet assembly 800 from a housing of the interchangeable or reconfigurable chilled air outlet 710. The reconfigurable chilled air outlet assembly 800 may be removed by unfastening fastening elements that fasten the reconfigurable chilled air outlet assembly 800 onto the housing of the interchangeable or reconfigurable chilled air outlet 710, and then pulling or sliding the reconfigurable chilled air outlet assembly 800 outward from the housing of the interchangeable or reconfigurable chilled air outlet 710. In this way, the vent panel 810 is removed from a first position of the housing of the interchangeable or reconfigurable chilled air outlet 710 and the closed panel 880 is removed from a second position of the housing of the interchangeable or reconfigurable chilled air outlet 710 distinct from and adjacent to the first position.

Figure 10C:
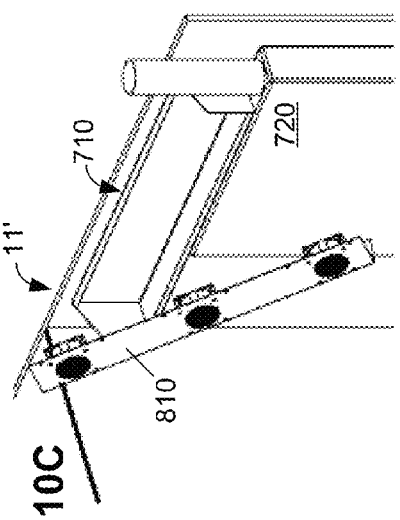

FIG. 10C illustrates a second step as rotating the reconfigurable chilled air outlet assembly 800 around by about 180 degrees (or upside down) in a plane approximately parallel with a length of the housing of the interchangeable or reconfigurable chilled air outlet 710 such that an interior side of the chilled air outlet assembly 800 remains facing an interior side of the housing. In this rotated position, the vent openings 820, 840, and 860 face forward toward the space where a galley food cart would sit in the galley cart compartment 11'. In some embodiments, the reconfigurable chilled air outlet assembly 800 may be reconfigured from the air-over to the air-through orientation without unplugging the power connector 890 from a power source, such as the air chiller system 700. In other embodiments, the power connector 890 of the reconfigurable chilled air outlet assembly 800 may be unplugged from the power source while the reconfigurable chilled air outlet assembly 800 is reconfigured from the air-over to the air-through orientation.

Figure 10D:
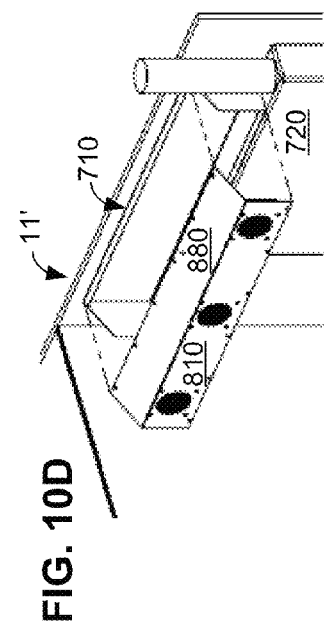

FIG. 10D illustrates a third step as reattaching the reconfigurable chilled air outlet assembly 800 onto the housing of the interchangeable or reconfigurable chilled air outlet 710. The reconfigurable chilled air outlet assembly 800 may be reattached by placing or sliding the reconfigurable chilled air outlet assembly 800 onto the housing of the interchangeable or reconfigurable chilled air outlet 710 and then fastening the reconfigurable chilled air outlet assembly 800 onto the housing of the interchangeable or reconfigurable chilled air outlet 710. In this way, the vent panel 810 is installed at the second position of the housing of the interchangeable or reconfigurable chilled air outlet 710 and the closed panel 880 is installed at the first position of the housing of the interchangeable or reconfigurable chilled air outlet 710 distinct from and adjacent to the first position.

Figure 10E:
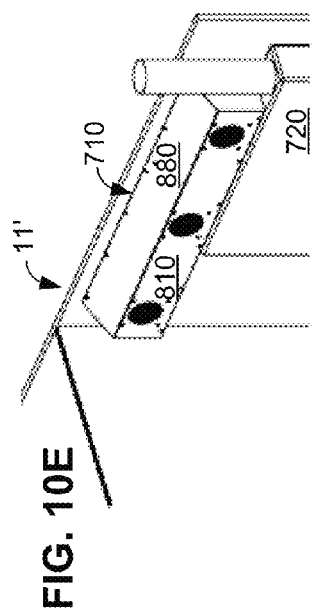

FIG. 10E illustrates the reconfigurable chilled air outlet assembly 800 in the air-through duct orientation after the reconfigurable chilled air outlet assembly 800 is fastened onto the housing of the interchangeable or reconfigurable chilled air outlet 710. As illustrated, in the air-through duct orientation, the vent openings 820, 840, and 860 face substantially horizontally outward toward the space where the galley food carts are stored in the galley cart compartment 11'. In the air-through duct orientation, the vent openings 820, 840, and 860 are oriented in a substantially horizontal direction such that chill air is blown by the fans 830, 850, and 870, respectively, substantially into mating ducts or vent openings in the galley food carts stored in the galley cart compartment 11'. In this configuration, the reconfigurable chilled air outlet assembly 800 is in fluid communication with air in the interior of galley food and beverage storage compartments of the galley food carts in parallel.

Figure 11:
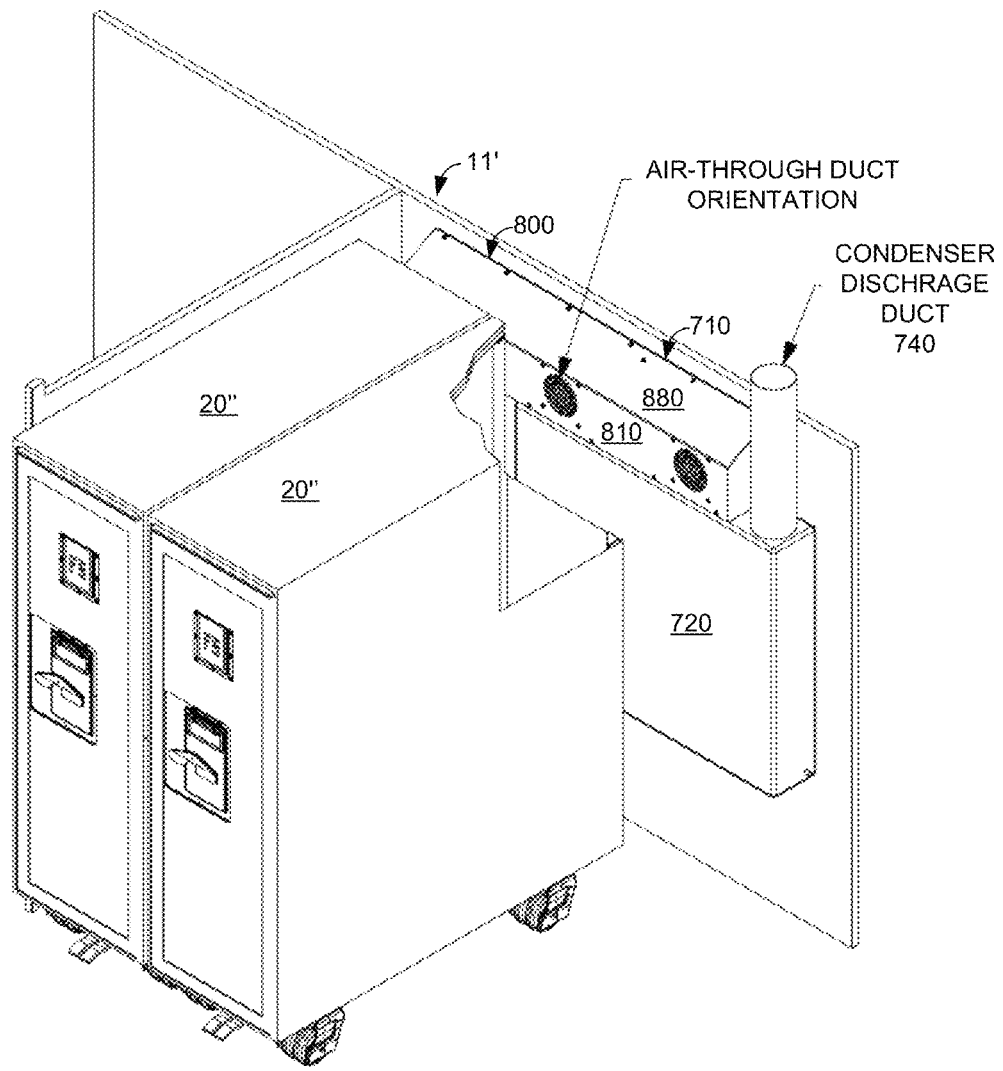
FIG. 11 illustrates a perspective view of the chiller system of FIG. 7 installed in an air-through duct orientation within a galley cart compartment area, according to an embodiment.

FIG. 11 illustrates a perspective view of the chiller system 700 installed in an air-through duct orientation within a galley cart compartment area 11', according to an embodiment. The galley cart compartment area 11' may be the same as the galley cart compartment area 11' of FIG. 9. Galley food carts 20", which may be embodiments of the galley food carts 20, may be removably disposed in front of the chiller system 700 within the galley cart compartment area 11'. The galley food carts 20" may be configured to interface with vent openings of a chilled air outlet in an air-through duct orientation as illustrated in FIG. 11.

Figure 12:
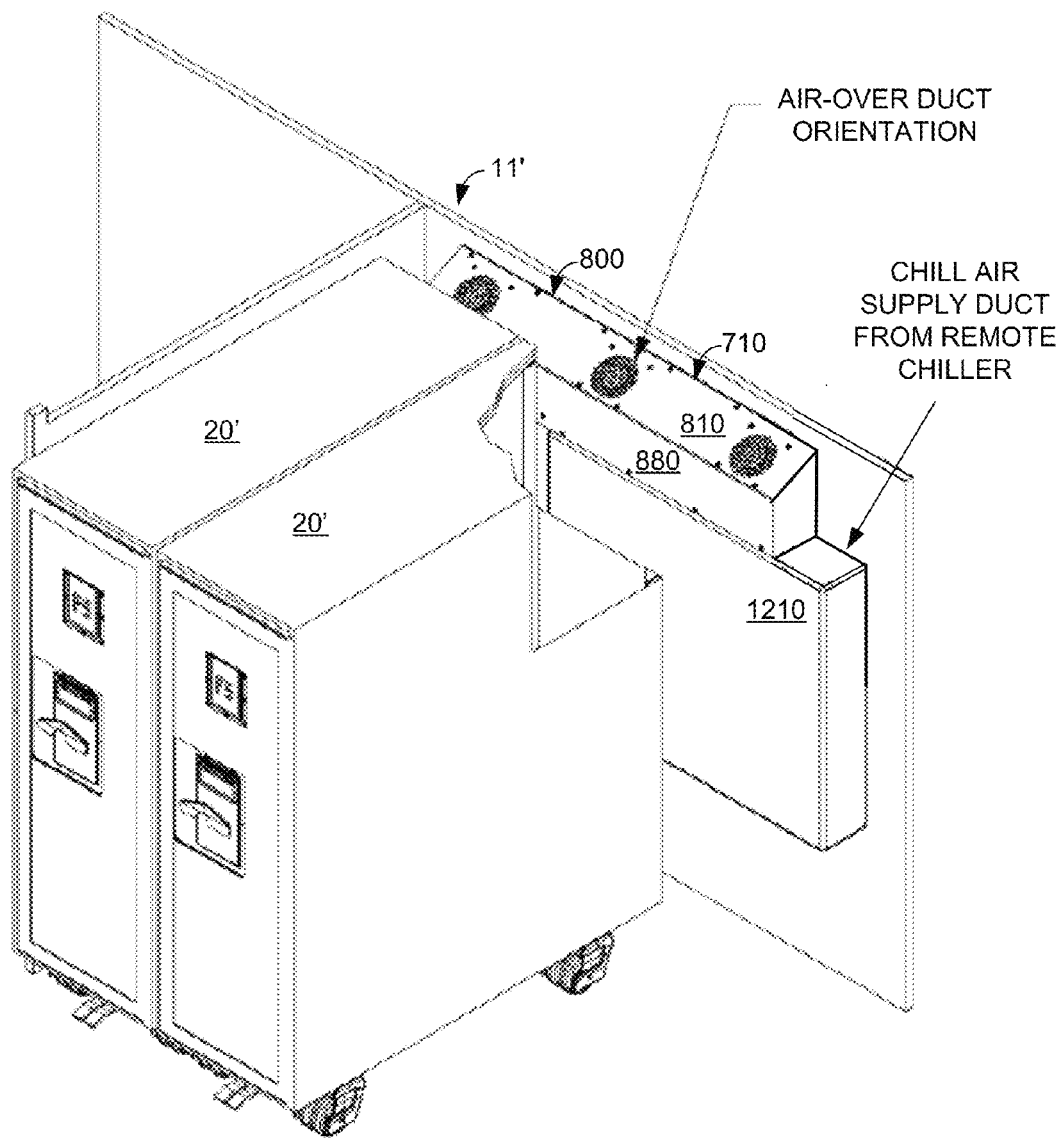
FIG. 12 illustrates a perspective view of a galley cart compartment area comprising an interchangeable or reconfigurable chilled air outlet coupled with a remote chiller via a chill air supply duct in an air-over duct orientation, according to an embodiment.

FIG. 12 illustrates a perspective view of a galley cart compartment area 11' comprising an interchangeable or reconfigurable chilled air outlet 710 coupled with a remote chiller (e.g., an embodiment of the remotely mounted air chiller system 727 of FIG. 7C) via a chill air supply duct 1210 in an air-over duct orientation. The galley cart compartment area 11' of FIG. 12 is similar to the galley cart compartment area 11' of FIG. 9 except that the air chiller 720 of FIG. 9 is replaced by the chill air supply duct 1210 which is in fluid communication with a remote chiller to provide chill air to the interchangeable or reconfigurable chilled air outlet 710. The chill air supply duct 1210 may be an embodiment of the one or more air ducts 767 of FIG. 7C.

Figure 13:
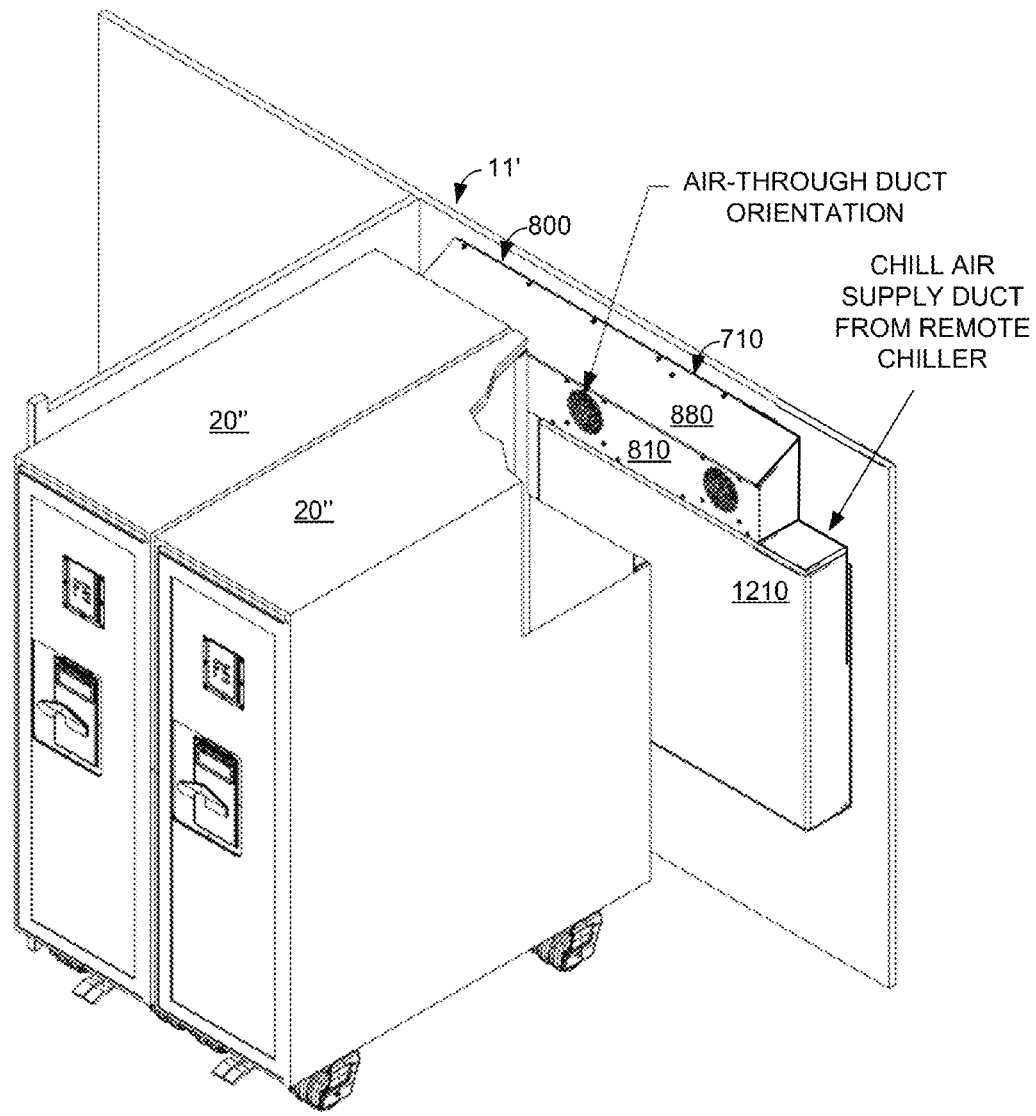
FIG. 13 illustrates a perspective view of a galley cart compartment area comprising an interchangeable or reconfigurable chilled air outlet coupled with a remote chiller via a chill air supply duct in an air-through duct orientation, according to an embodiment.

FIG. 13 illustrates a perspective view of a galley cart compartment area comprising an interchangeable or reconfigurable chilled air outlet 710 coupled with a remote chiller via a chill air supply duct 1210 in an air-through duct orientation. The galley cart compartment area 11' of FIG. 13 is similar to the galley compartment area 11' of FIG. 11 except that the air chiller 720 of FIG. 11 is replaced by the chill air supply duct 1210 which is in fluid communication with a remote chiller to provide chill air to the interchangeable or reconfigurable chilled air outlet 710.

Figure 14:
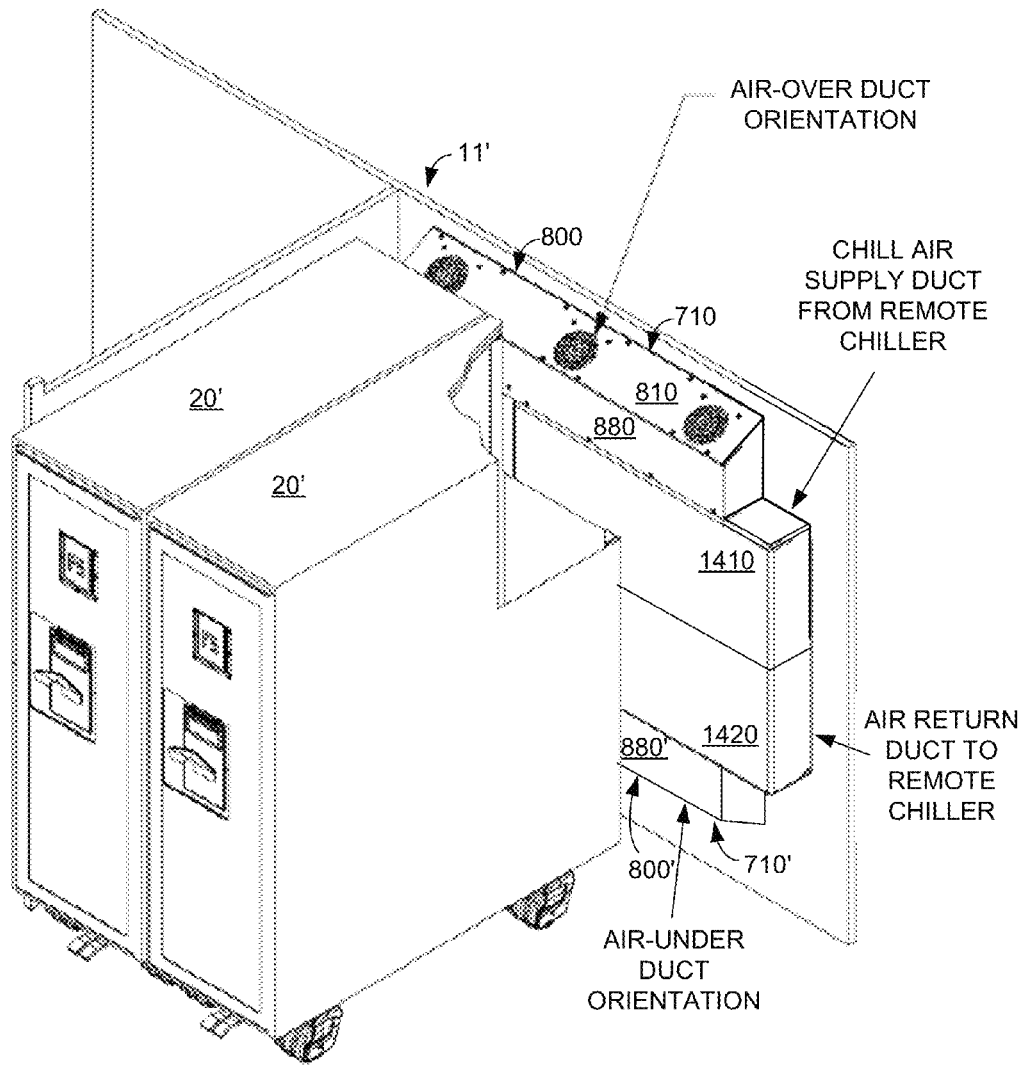
FIG. 14 illustrates a perspective view of a galley cart compartment area comprising an interchangeable or reconfigurable vent system including an interchangeable or reconfigurable chilled air outlet coupled with a remote chiller via a chill air supply duct in an air-over duct orientation and an interchangeable or reconfigurable air return inlet coupled with the remote chiller via an air return duct in an air-under duct orientation, according to an embodiment.

FIG. 14 illustrates a perspective view of a galley cart compartment area comprising an interchangeable or reconfigurable vent system including an interchangeable or reconfigurable chilled air outlet 710 coupled with a remote chiller (e.g., an embodiment of the remotely mounted air chiller system 727 of FIG. 7C) via a chill air supply duct 1410 in an air-over duct orientation and an interchangeable or reconfigurable air return inlet 710' coupled with the remote chiller via an air return duct 1420 in an air-under duct orientation. The galley cart compartment area 11' of FIG. 14 is similar to the galley compartment area 11' of FIG. 12 except that instead of a single chill air supply duct 1210 which is in fluid communication with a remote chiller to provide chill air to the interchangeable or reconfigurable chilled air outlet 710, the galley cart compartment area 11' of FIG. 14 comprises an interchangeable or reconfigurable chilled air outlet 710 coupled with the remote chiller via a chill air supply duct 1410 in an air-over duct orientation and an interchangeable or reconfigurable air return inlet 710' coupled with the remote chiller via an air return duct 1420 in an air-under duct orientation. The chill air supply duct 1410 is in fluid communication with the remote chiller to provide chill air to the interchangeable or reconfigurable chilled air outlet 710, while the air return duct 1420 is in fluid communication with the remote chiller to return warmed air from the interchangeable or reconfigurable air return inlet 710'. The chill air supply ducts 1410 and 1420 may be embodiments of the one or more air ducts 767 of FIG. 7C.

While the chill air supply duct 1410 is shown above the air return duct 1420 in FIG. 14, this should not be construed as limiting. In other embodiments, the chill air supply duct 1410 may be below the air return duct 1420, or the chill air supply duct 1410 may be beside the air return duct 1420 with each having additional ducting that couples with corresponding interchangeable or reconfigurable chilled air outlet 710 and interchangeable or reconfigurable air return inlet 710', respectively. In addition, although the interchangeable or reconfigurable chilled air outlet 710 is shown above the interchangeable or reconfigurable air return inlet 710', this should not be construed as limiting, as in other embodiments, the interchangeable or reconfigurable air return inlet 710' may be above the interchangeable or reconfigurable chilled air outlet 710. Further, in some embodiments, the interchangeable or reconfigurable chilled air outlet 710 may comprise a reconfigurable chilled air outlet assembly 800 which is essentially identical to a reconfigurable air return inlet assembly 800' of the interchangeable or reconfigurable air return inlet 710', while in other embodiments, the reconfigurable air return inlet assembly 800' of the interchangeable or reconfigurable air return inlet 710' may be constructed differently to be customized for its different application in conjunction with the air return duct 1420 than the application of the reconfigurable chilled air outlet assembly 800 in conjunction with the chill air supply duct 1410.

Figure 15:
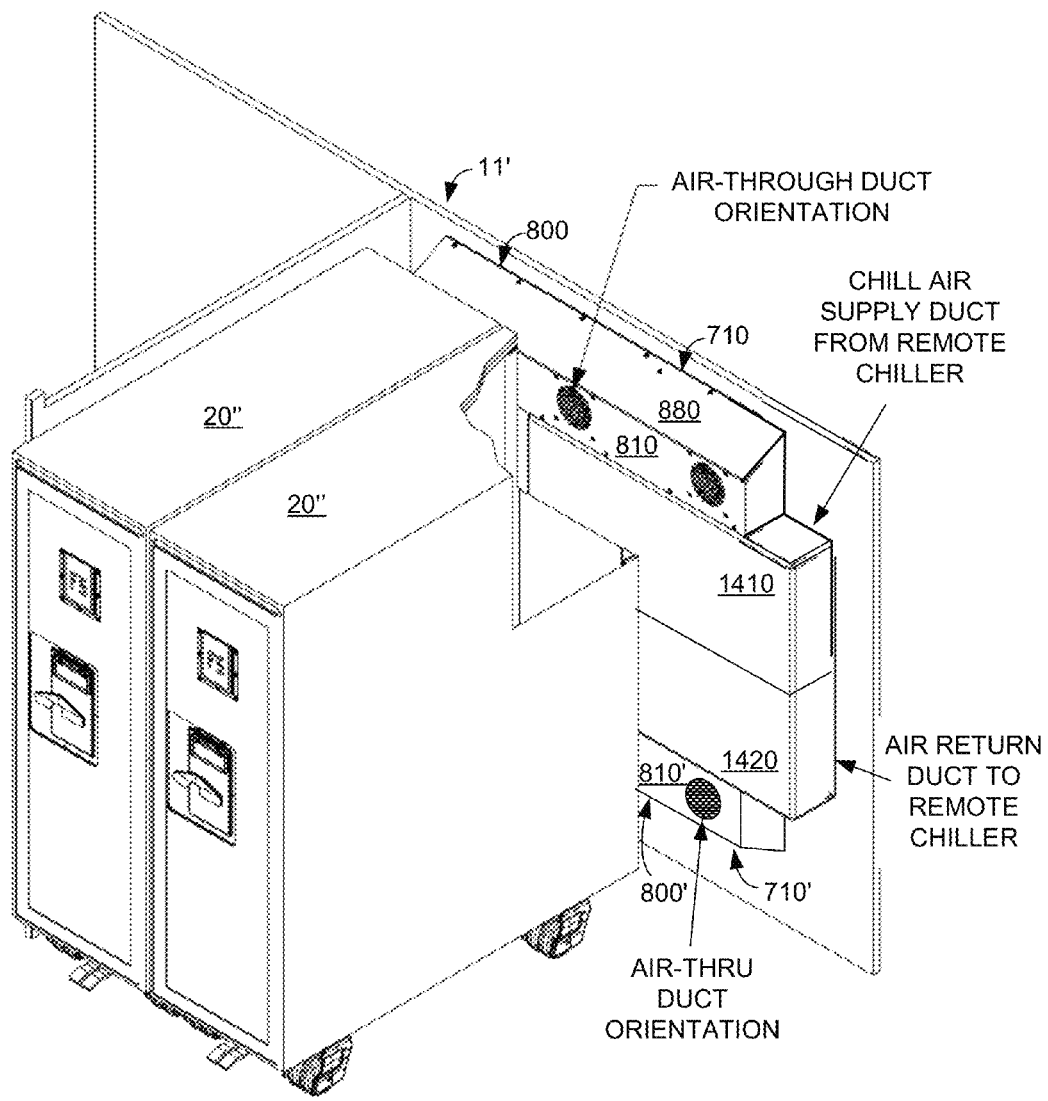
FIG. 15 illustrates a perspective view of a galley cart compartment area comprising an interchangeable or reconfigurable vent system including an interchangeable or reconfigurable chilled air outlet coupled with a remote chiller via a chill air supply duct in an air-through duct orientation and an interchangeable or reconfigurable return air inlet coupled with the remote chiller via an air return duct in an air-through duct orientation, according to an embodiment.

FIG. 15 illustrates a perspective view of a galley cart compartment area comprising an interchangeable or reconfigurable vent system including an interchangeable or reconfigurable chilled air outlet 710 coupled with a remote chiller via a chill air supply duct 1410 in an air-through duct orientation and an interchangeable or reconfigurable air return inlet 710' coupled with a remote chiller via an air return duct 1420 in an air-through duct orientation. The galley cart compartment area 11' of FIG. 15 is similar to the galley compartment area 11' of FIG. 14 except that the interchangeable or reconfigurable chilled air outlet 710 of FIG. 15 is configured with the reconfigurable chilled air outlet assembly 800 in an air-through orientation and the interchangeable or reconfigurable air return inlet 710' of FIG. 15 is configured with the reconfigurable air return inlet assembly 800' in an air-through orientation as well.

In various embodiments, one or more features of one embodiment disclosed herein may be utilized in conjunction with one or more features of another embodiment disclosed herein, unless clearly contradicted by disclosure to the contrary. For example, both the interchangeable or reconfigurable chilled air outlet 710 comprising the reconfigurable chilled air outlet assembly 800 and the interchangeable or reconfigurable air return inlet 710' comprising the reconfigurable air return inlet assembly 800' of FIGS. 14 and 15 may be utilized in conjunction with the air chiller 720 of FIGS. 9 and 11.

An aircraft including one or more reconfigurable or interchangeable chilled air outlets 710 installed in an air-over duct orientation within a galley cart compartment area 11' may be sold to, leased to, or otherwise used by a new owner or entity that desires to use galley food carts 20' that are configured to interface with vent openings of a chilled air outlet in an air-over duct orientation, and may therefore be suitable for use by the owner or entity without requiring different galley food carts or a replacement of components of a chiller system or associated ducts. However, the aircraft may later be sold to, leased to, or otherwise used by a different owner or entity that desires to use different galley food carts 20" that are configured to interface with vent openings of a chilled air outlet in an air-through duct orientation. Rather than requiring an expensive refit of the aircraft to replace the existing chiller system or ducts that mate with air-over galley food carts 20' with a new chiller system or ducts that mate with air-through galley food carts 20", embodiments as described herein may be easily and inexpensively reconfigured using all or most of the same hardware of the original chiller system or ducts in an air-through duct orientation. In this way, the cost and time associated with the refit is saved, and the new owner or operator of the aircraft would not need to use a different type of galley food cart than desired.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

TABLE OF REFERENCE CHARACTERS 10 aircraft galley food services system
11 galley cart compartment
11' galley cart compartment
12 cart compartment outer case
20 galley food cart
20' galley food cart
20" galley food cart
30 air chiller system
50 vent assembly
52a upper duct
52b lower duct
54 cart vent assembly
56 cart vent boots/cart vents
100 air chiller unit
102 case
103 case main surface
104 power connection
106 unsealed case partition
108 sealed case partition
110 chilled supply air vent
111 filter
112 return air vent
114 condenser supply
116 condenser exhaust
130 condenser
132 condenser fan
134 condenser input line
136 condenser output line
140 compressor
142 compressor input line
150 evaporator
152 evaporator fan
154 evaporator input line
156 evaporator output line
160 heat exchanger
162 compressor output
164 condenser input
166 evaporator output
168 evaporator input
170 sight glass
172 filter/drier
174 solenoid valve
176 thermal expansion valve (TXV)
176a temperature sensing bulb
178 pressure safety switch
700 air chiller system
705 air chiller system
707 air chiller system
710 reconfigurable or interchangeable chilled air outlet
710' reconfigurable or interchangeable air return inlet
720 air chiller
725 storage compartment cooling apparatus
727 remotely mounted air chiller system
730 condenser air inlet
740 condenser air outlet
750 evaporator air inlet
755 storage compartment cooling apparatus air inlet
760 evaporator air outlet
765 storage compartment cooling apparatus outlet ducting
760 evaporator air outlet
767 one or more air ducts
800 reconfigurable chilled air outlet assembly (vent opening assembly)
800' reconfigurable air return inlet assembly (vent opening assembly)
810 vent panel
810' vent panel
820 vent opening
830 fan
840 vent opening
850 fan
860 vent opening
870 fan
880 closed panel
880' closed panel
890 power connector
1210 chill air supply duct
1410 chill air supply duct
1420 air return duct

What is claimed is:

1. A reconfigurable aircraft galley chiller vent system comprising:
a first duct in fluid communication with an aircraft galley chiller and configured to receive chill air from the aircraft galley chiller;
a first vent in fluid communication with the first duct and configured to provide the chill air to one or more galley food and beverage storage compartments which receive the chill air in parallel with one another, the first vent comprising:
a first housing; and
a chilled air outlet assembly removably fastened to the first housing, the chilled air outlet assembly configurable into an air-through orientation as well as being configurable into an air-over orientation by rotating the chilled air outlet assembly such that an interior side of the chilled air outlet assembly remains facing an interior side of the first housing, the chilled air outlet assembly including a vent panel having one or more vent openings through which air flows and a closed panel through which no air flows or less air flows in comparison with the vent panel, an edge of the closed panel is adjacent to an edge of the vent panel;
wherein when the chilled air outlet assembly of the first vent is configured in the air-through orientation, the vent panel is installed at a first position of the first housing while the closed panel is installed at a second position of the first housing distinct from and adjacent to the first position such that the first vent directs the chill air substantially toward an interior of the one or more galley food and beverage storage compartments at a first angle,
wherein when the chilled air outlet assembly of the first vent is configured in the air-over orientation, the vent panel is installed at the second position of the first housing while the closed panel is installed at the first position of the first housing such that the first vent directs the chill air around the one or more galley food and beverage storage compartments at a second angle different from the first angle,
wherein the first angle and the second angle are relative to a horizontal plane between the first vent and the one or more galley food and beverage storage compartments, and
wherein the closed panel is disposed at a third angle, the third angle being relative to a plane of the vent panel and being the absolute value of a difference between the first angle and the second angle.

2. The reconfigurable aircraft galley chiller vent system of claim 1, wherein the chilled air outlet assembly further comprises one or more fans installed adjacent to the one or more vent openings and configured to cause air to flow through the one or more vent openings outward from the first vent.

3. The reconfigurable aircraft galley chiller vent system of claim 1, further comprising:
   a second duct in fluid communication with the aircraft galley chiller and configured to provide return air to the aircraft galley chiller;
   a second vent in fluid communication with the second duct and configured to receive the return air from the one or more galley food and beverage storage compartments, the one or more galley food and beverage storage compartments providing the return air to the second vent in parallel with one another, the second vent comprising:
      a second housing; and
      a return air inlet assembly removably fastened to the second housing, the return air inlet assembly configurable into an air-through orientation as well as being configurable into an air-over orientation by rotating the return air inlet assembly such that an interior side of the return air inlet assembly remains facing an interior side of the second housing, the return air inlet assembly including a vent panel having one or more vent openings through which air flows and a closed panel through which no air flows or less air flows in comparison with the vent panel, an edge of the closed panel of the return air inlet assembly is adjacent to an edge of the vent panel of the return air inlet assembly,
   wherein when the return air inlet assembly of the second vent is configured in the air-through orientation, the vent panel of the return air inlet assembly is installed at a first position of the second housing while the closed panel of the return air inlet assembly is installed at a second position of the second housing distinct from and adjacent to the first position of the second housing such that the second vent receives the return air substantially from the interior of the one or more galley food and beverage storage compartments at a fourth angle,
   wherein when the return air inlet assembly of the second vent is configured in the air-over orientation, the vent panel of the return air inlet assembly is installed at the second position of the second housing while the closed panel of the return air inlet assembly is installed at the first position of the second housing such that the second vent receives the return air from around the one or more galley food and beverage storage compartments at a fifth angle different from the fourth angle,
   wherein the fourth angle and the fifth angle are relative to a horizontal plane between the second vent and the one or more galley food and beverage storage compartments, and
   wherein the closed panel of the return air inlet assembly is disposed at a sixth angle, the sixth angle being relative to a plane of the vent panel of the return air inlet assembly and, being the absolute value of a difference between the fourth angle and the fifth angle.

4. The reconfigurable aircraft galley chiller vent system of claim 3, wherein the return air inlet assembly further comprises one or more fans installed adjacent to the one or more vent openings and configured to cause air to flow through the one or more vent openings inward to the second vent.

5. The reconfigurable aircraft galley chiller vent system of claim 1, wherein each of the one or more galley food and beverage storage compartments comprises a trolley that moves the respective galley food and beverage storage compartment toward the first vent to establish fluid communication between the first vent and the food and beverage storage compartment, and away from the first vent to disconnect fluid communication between the first vent and the food and beverage storage compartment.

6. The reconfigurable aircraft galley chiller vent system of claim 1, wherein the aircraft galley chiller includes:
   a rectangular case encasing components of a vapor cycle system, the case comprising two main surfaces having a larger surface area than four remaining surfaces of the case,
   a condenser,
   a compressor, and
   an evaporator,
   wherein the condenser, compressor, and evaporator operate as part of the vapor cycle system to provide chill air to the first duct.

7. The reconfigurable aircraft galley chiller vent system of claim 1, wherein the aircraft galley chiller is remotely mounted from the one or more galley food and beverage storage compartments, the aircraft galley chiller comprising:
   a condenser,
   a compressor, and
   an evaporator,
   wherein the condenser, compressor, and evaporator operate as part of a vapor cycle system to provide chill air to the first duct via one or more remote chill air ducts.

8. The reconfigurable aircraft galley chiller vent system of claim 1, wherein the aircraft galley chiller includes:
   a liquid to air heat exchanger coupled with a supplemental liquid cooling system that comprises a remote chiller that chills liquid coolant that flows through the liquid to air heat exchanger; and
   a fan that causes air to flow through the liquid to air heat exchanger to be chilled, wherein the chilled air is provided to the first duct as the chill air.

9. A method of reconfiguring a vent system including
   a duct in fluid communication with an aircraft galley chiller and configured to receive chill air from the aircraft galley chiller;
   a vent in fluid communication with the duct and configured to provide the chill air to one or more galley food and beverage storage compartments which receive the chill air in parallel with one another, the vent including
      a housing; and
      a chilled air outlet assembly removably fastened to the housing, the chilled air outlet assembly configurable into an air-through orientation as well as being configurable into an air-over orientation by rotating the chilled air outlet assembly such that an interior side of the chilled air outlet assembly remains facing an interior side of the housing, the chilled air outlet assembly including a vent panel having one or more vent openings through which air flows and a closed panel through which no air flows or less air flows in comparison with the vent panel, an edge of the closed panel is adjacent to an edge of the vent panel;

wherein when the chilled air outlet assembly is configured in the air-through orientation, the vent panel is installed at a first position of the housing while the closed panel is installed at a second position of the housing distinct from and adjacent to the first position such that the vent directs the chill air substantially toward an interior of the one or more galley food and beverage storage compartments at a first angle, wherein when the chilled air outlet assembly is configured in the air-over orientation, the vent panel is installed at the second position of the housing while the closed panel is installed at the first position of the housing such that the first vent directs the chill air around the one or more galley food and beverage storage compartments at a second angle different from the first angle, wherein the first angle and the second angle are relative to a horizontal plane between the vent and the one or more galley food and beverage storage compartments, and wherein the closed panel is disposed at a third angle, the third angle being relative to a plane of the vent panel and being the absolute value of a difference between the first angle and the second angle, the method comprising:
configuring the vent to be in fluid communication with the aircraft galley chiller to receive chill air from the aircraft galley chiller configuring the vent to be in fluid communication with the one or more galley food and beverage storage compartments in parallel in one of the air-through or the air-over orientation, in which the vent is in fluid communication with air in the interior of the one or more galley food and beverage storage compartments in the air-through orientation at the first angle, and the vent is in fluid communication with air substantially around the one or more galley food and beverage storage compartments in the air-over orientation at the second angle different from the first angle; and reconfiguring the vent to be in fluid communication with the one or more galley food and beverage storage compartments in parallel in the other of the air-through or the air-over orientation.

10. The method of claim 9, wherein reconfiguring the vent system comprises:
unfastening the chilled air outlet assembly from the housing of the vent;
removing the vent panel from the first position of the housing and removing the closed panel from the second position of the housing distinct from and adjacent to the first position;
installing the vent panel at the second position of the housing and installing the closed panel at the first position of the housing; and
fastening the rotated chilled air outlet assembly onto the housing of the vent.

11. The method of claim 9, wherein the vent receives chill air from the aircraft galley chiller and cools the one or more galley food and beverage storage compartments by directing the chill air toward or around the one or more galley food and beverage storage compartments.

12. The method of claim 9, wherein a second vent provides return air to the aircraft galley chiller by receiving the return air from the interior of or from around the one or more galley food and beverage storage compartments.

13. The method of claim 9, further comprising providing return air through a return air inlet assembly to the aircraft galley chiller by receiving the return air from the interior of or from around the one or more galley food and beverage storage compartments.

* * * * *